United States Patent
Hasek et al.

(10) Patent No.: US 7,592,912 B2
(45) Date of Patent: Sep. 22, 2009

(54) EMERGENCY ALERT DATA DELIVERY APPARATUS AND METHODS

(75) Inventors: Charles Hasek, Broomfield, CO (US); Kenneth Gould, Oakton, VA (US)

(73) Assignee: Time Warner Cable Inc., New York, NY (US)

(*) Notice: Subject to any disclaimer, the term of this patent is extended or adjusted under 35 U.S.C. 154(b) by 488 days.

(21) Appl. No.: 11/299,169

(22) Filed: Dec. 9, 2005

(65) Prior Publication Data

US 2007/0136743 A1    Jun. 14, 2007

(51) Int. Cl.
*G08B 1/08* (2006.01)
(52) U.S. Cl. .................................. 340/539.16
(58) Field of Classification Search ............. 340/531, 340/517, 601, 691.1, 691.6, 539.16; 725/33, 725/86, 114, 108
See application file for complete search history.

(56) References Cited

U.S. PATENT DOCUMENTS

| | | | |
|---|---|---|---|
| 3,993,955 A | 11/1976 | Belcher et al. | |
| 6,240,555 B1 | 5/2001 | Shoff et al. | |
| 6,452,492 B1 | 9/2002 | Drury | |
| 6,615,175 B1 | 9/2003 | Gazdzinski | |
| 6,714,534 B1 | 3/2004 | Gerszberg et al. | |
| 6,766,163 B1 | 7/2004 | Sharma | |
| 6,771,302 B1 | 8/2004 | Nimri et al. | |
| 6,792,616 B1 | 9/2004 | Jerding | |
| 6,903,779 B2 | 6/2005 | Dyer | |
| 7,114,169 B1 | 9/2006 | Kahn | |
| 7,119,675 B2 | 10/2006 | Khandelwal | |
| 7,126,454 B2 | 10/2006 | Bulmer | |
| 7,142,892 B2 | 11/2006 | Dennis et al. | |
| 7,159,230 B2 | 1/2007 | Manson et al. | |
| 7,296,074 B2 * | 11/2007 | Jagels | 709/227 |
| 7,324,003 B2 * | 1/2008 | Yun | 340/601 |
| 7,336,942 B2 | 2/2008 | Wang | |
| 2002/0080038 A1 * | 6/2002 | Smith | 340/601 |
| 2003/0121036 A1 | 6/2003 | Lock et al. | |
| 2003/0169182 A1 * | 9/2003 | Wilhelm et al. | 340/905 |
| 2003/0217365 A1 | 11/2003 | Caputo | |
| 2004/0181811 A1 | 9/2004 | Rakib | |
| 2005/0015799 A1 | 1/2005 | Park | |
| 2005/0151639 A1 | 7/2005 | Bulmer | |
| 2005/0162267 A1 * | 7/2005 | Khandelwal et al. | 340/506 |
| 2005/0198684 A1 | 9/2005 | Stone et al. | |
| 2006/0040639 A1 | 2/2006 | Karl | |
| 2006/0161946 A1 | 7/2006 | Shin | |
| 2007/0004377 A1 | 1/2007 | Medford et al. | |
| 2007/0033531 A1 | 2/2007 | Marsh | |
| 2007/0136777 A1 | 6/2007 | Hasek | |
| 2007/0207771 A1 | 9/2007 | Bowser et al. | |

* cited by examiner

*Primary Examiner*—Phung Nguyen
(74) *Attorney, Agent, or Firm*—Gazdzinski & Associates, PC

(57) ABSTRACT

Apparatus and methods for efficiently and flexibly providing emergency alert data (e.g., EAS messages) to subscribers of a content-based network, such as for example Internet protocol television (IPTV) subscribers. In one exemplary embodiment, the apparatus includes a server performing real-time receipt and encapsulation of the EAS data (which may comprise audio, video, and/or text), transport of the EAS data to client devices over the network, and use of one or more applications running on the client devices to decode and display/present the EAS data in a manner which effectively guarantees that it will be perceived by the viewer. In one variant, instant messaging (IM) infrastructure is used to authenticate clients and receive and display at least portion of the EAS data via a separate transport process. Server and client-side apparatus adapted for EAS data receipt, decoding and display are also disclosed.

26 Claims, 10 Drawing Sheets

EMERGENCY ALERT DATA DELIVERY APPARATUS AND METHODS

RELATED APPLICATIONS

This application is related to co-pending U.S. patent application Ser. No. 11/298,247 filed contemporaneously herewith and entitled "CAPTION DATA DELIVERY APPARATUS AND METHODS", which is incorporated herein by reference in its entirety.

BACKGROUND OF THE INVENTION

1. Field of Invention

The present invention relates generally to the field of delivery of digital media data (e.g., text, video, and/or audio) over networks such as the Internet, and specifically in one aspect to delivering emergency alert system (EAS) data in a broadcast "IPTV" network.

2. Description of Related Technology

Emergency Alert System (EAS)—

As is well known, the Emergency Alert System (EAS) is designed to allow for the rapid and widespread dissemination of information relating to a national or local emergency to the general public. EAS messages are transmitted for either national, state or local emergencies or other events. Examples of these emergencies or events include: severe weather watch/storm warning, flash floods, earthquakes/tsunami, and war or other "man made" emergencies.

The EAS was designed in part by the Federal Communications Commission (FCC) in cooperation with the National Weather Service (NWS) and the Federal Emergency Management Agency (FEMA), in order to support the roles of each organization. The FCC provides information to broadcasters, cable system operators, and other participants in the EAS regarding the technical and operational requirements of the EAS. Additionally, the FCC ensures that state and local EAS plans conform to FCC rules and regulations. The NWS provides emergency weather information to alert the public about dangerous or potentially conditions weather conditions or other natural events. FEMA provides direction for state and local emergency planning officials to plan and implement their roles in the EAS.

Since Dec. 31, 1998, cable systems that have 10,000 or more subscribers are part of the EAS. These cable systems have the capability to transmit emergency messages on all of their video channels.

Alerts sent via the EAS may arrive in the form of text, audio and/or video content. Depending on the message type, the subscriber's television or set-top box (STB) will display the message in the appropriate format and according to the prescribed method. State and Local area emergency messages may be transmitted by using EAS Header and End of Message Codes. In television environments, the FCC recommends that the codes be preceded by an announcement that informs listeners that an EAS transmission will occur.

In current digital and analog television systems, the EAS transmissions are received from an over-the-air broadcast. The transmission is then used in two different ways.

First, for analog broadcasts, all of the analog channels are either force-tuned to a broadcast of the EAS transmission or create the appropriate overlay of text and audio. Nothing is required at the subscriber (e.g., set-top box) side since all switching and display functionality is performed in the network head-end.

Second, for digital broadcasts, the digital head-end application server receives the transmission and creates the proper audio, video and/or text message for the digital set-top box (DSTB) or other consumer premises equipment. The DSTB is then responsible for displaying the message to the user as prescribed by the government mandate. If the EAS transmission is video, then the DSTB will "forcibly" tune its tuner to the appropriate analog RF channel to receive, decode and display the video.

Testing of the EAS system generally comprises a weekly test consisting of an eight-second digital data signal. There is also a monthly test that utilizes a test script (e.g., "This is a test of the Emergency Alert System—this is only a test . . ."). The monthly test script may be developed locally and may contain information that is relevant to the local area into which it is being delivered.

Other features of the digital EAS systems include:

(i) Automatic Operation—The EAS digital system architecture allows broadcast stations, cable systems, participating satellite companies, and other services to send and receive emergency information quickly and automatically even if those facilities are unattended;

(ii) Redundancy—The EAS requires monitoring of at least two independent sources for emergency information. This insures that emergency information is received and delivered to viewers and listeners; and (iii) Multi-language—EAS digital messages can be automatically converted into any language used by the broadcast station or cable system.

"IPTV" and other Network Paradigms—

Recently, network operators have begun using other types of networks such as Internet protocol (IP) networks to distribute broadcast television programming to subscribers. This is to be contrasted with more traditional radio frequency (over-the-air) broadcasts, or in-band delivery via packetized MPEG-2 program streams. Such IP delivery of broadcast television programming also requires a method for the delivery of EAS data to subscriber units such as personal computers (PC), as well as a method to display such information on the display monitor (and audio system) of these units.

In emerging Internet protocol television (IPTV) and similar distribution networks, a wider choice of audio/video codecs is being considered. For example, MPEG-2, MPEG-4/H.264 (advanced video codec or "AVC"), Windows Media Codec by Microsoft, and RealVideo by Real Networks are a few of the possible audio/video compression formats that have been deployed. While these new formats and their associated compression technology is useful in providing streaming audio/video programs to end users, these formats do not typically support any type of EAS data delivery. While some video codecs have the ability to embed caption or similar information within the video stream (MPEG-2/MPEG-4, etc.), many video codecs do not (e.g., RealVideo). Accordingly, the ability to transport at least some of the EAS information to the displaying client outside of the content (e.g., video) packet streams would be of particular utility.

Other Emergency Alert Approaches—

A variety of other approaches to emergency alert transmission over a network (and display be user devices) are evidenced in the prior art. For example, U.S. Pat. No. 3,993,955 to Belcher, et al. issued Nov. 23, 1976 entitled "Method and apparatus for establishing emergency communications in a two-way cable television system" discloses a two-way cable television communications system wherein a central or master station is coupled to a plurality of remote stations through a coaxial cable network, each remote unit is provided with means for decoding an emergency alert transmission signal from the master station to generate an internal signal to sound an annunciator, alerting a subscriber or viewer at the remote station that an emergency communication is forthcoming, switching on a television receiver at the remote station, if the television receiver is not on, and tuning the television receiver through a converter to a predetermined television channel to condition the television receiver to receive emergency communications from the master station.

U.S. Pat. No. 6,240,555 issued May 29, 2001 to Shoff, et al entitled "Interactive entertainment system for presenting supplemental interactive content together with continuous video programs" discloses an interactive entertainment system that enables presentation of supplemental interactive content along side traditional broadcast video programs. The programs are broadcast in a conventional manner. The supplemental content is supplied as part of the same program signal over the broadcast network, or separately over another distribution network. A viewer computing unit is located at the viewer's home to present the program and supplemental content to a viewer. When the viewer tunes to a particular channel, the viewer computing unit consults an electronic programming guide (EPG) to determine if the present program carried on the channel is interactive. If it is, the viewer computing unit launches a browser. The browser uses a target specification stored in the EPG to activate a target resource containing the supplemental content for enhancing the broadcast program. The target resource contains display layout instructions prescribing how the supplemental content and the video content program are to appear in relation to one another when displayed. When the data from the target resource is downloaded, the viewer computing unit is responsive to the layout instructions obtained from the target resource to display the supplemental content concurrently with the video content program. Embedding the layout instructions in the supplemental content places control of the presentation to the content developers.

U.S. Pat. No. 6,452,492 to Drury issued on Sep. 17, 2002 entitled "Emergency alert system" discloses an alert system for providing an alert of an actual or impending emergency to homes, businesses and the like. The alert system is used in cable system network over which communication signals are transmitted to a receiver remote from the transmitter. Such communication signals have associated therewith at least one distinguishable modulation frequency. The alert system includes a mechanism for receiving an alert request and a transmitter for transmitting an alert signal in response to the alert request. The transmitter is coupled with the cable system and generates an alert signal which is modulated at a frequency distinguishable from the frequencies of the communication signals. The transmitter includes a sideband filter to reduce the subharmonics generated around the alert signal frequency. The receiver includes a mechanism for detecting a valid alert signal from the alert signal received and for generating an alarm signal therefrom. The alert system also comprises an alarm indicator connected to the receiver providing an alarm upon receipt of an alarm signal.

U.S. Pat. No. 6,714,534 to Gerszberg, et al. issued Mar. 30, 2004 entitled "Lifeline service for HFCLA network using wireless ISD" discloses a system architecture for bypassing a local exchange carrier comprises an intelligent terminal, a residential gateway coupled to the terminal, a cable facility management platform terminating a twisted pair or coaxial cable facility and a network service platform. The twisted pair and/or coaxial cable fed, integrated residence gateway controlled intelligent terminal or set-top device provides a plurality of enhanced services. One necessary service is lifeline service that may be provided over the coaxial cable via a cable modem of the integrated residence gateway, over the twisted pair facility or via wireless means. The integrated residence gateway is coupled to either or both of the coaxial cable or twisted pair and distributes the bandwidth facilities available over either service vehicle to customer devices including the set top box. Wireless lifeline or emergency services may be offered through transceivers placed at the integrated residence gateways and/or at taps feeding the integrated residence gateways.

U.S. Pat. No. 6,766,163 issued Jul. 20, 2004 to Sharma entitled "Method and system of displaying teletext information on mobile devices" discloses a communication system and method for communicating teletext information to mobile stations. A wireless access protocol (WAP) server is coupled to a television station and receives a signal which includes teletext information from the station. The WAP server includes a teletext decoder which decodes the teletext information in the transmitted signal. The decoded information is stored in memory using a server controller. The controller receives information requests from a network interface coupled to the mobile stations. The controller accesses the teletext information stored in memory and transmits the information to the mobile station through the network interface.

U.S. Pat. No. 6,771,302 issued Aug. 3, 2004 to Nimri, et al entitled "Videoconference closed caption system and method" discloses a system and method for closed caption in a videoconference environment. In a method according to one embodiment of the invention, a connection is established with a videoconference device. Subsequently, a closed caption page associated with the videoconference device is selected. Text is then entered on the closed caption page. The text is displayed to at least one device associated with a videoconference in which the videoconference device is participating.

U.S. Pat. No. 6,792,616 issued Sep. 14, 2004 entitled "System and method for providing a plurality of programming services in a television system" discloses a system and method of providing for displaying a full service cable television system. The cable television system is adapted to provide a plurality of different user services. Accordingly, the system and method are designed to allow a user to access services in an efficient memory conserving fashion. Using a plurality of data tables, a cable television system is able to access a plurality of different services including cable channels, interactive program guides, pay per view activation, video on demand and interactive online services such as world wide web browsing and E-mail via their home television set. A mechanism is provided whereby applications on a home device (HCT) can be activated from the server via a signaling message received from the HCT, to provide the user with services such as Emergency Alert Messages, email, and other messaging.

U.S. Pat. No. 6,903,779 issued Jun. 7, 2005 to Dyer entitled "Method and system for displaying related components of a media stream that has been transmitted over a computer network" discloses a system and method for displaying related components of a media stream that has been transmitted over a computer network that includes at least one storage device that communicates with a television decoder and with the video display. Information from one or more components of the media stream is extracted from the media stream and delivered to one or more storage devices. This stored component is subsequently transmitted to the video display in response to an information release signal that is embedded in the information. The invention can be used to display closed caption and other information with associated audio and video signals using an audio-visual media player.

United States Patent Application No. 20030121036 to Lock, et al. published on Jun. 26, 2003 entitled "CATV messaging alert system" discloses an invention that relates generally to use of standard video scan lines of commercial television programming in a cable television system for transmitting alerting and other messaging information, to an alert receiver unit at an end user's address. The alert receiver unit operates completely independently of any television set at the end user's address, other than to send the CATV signal from the alert receiver unit to the television set. The subscriber or other user can send certain pre-selected signals to the operator of the cable TV system, to another subscriber/user, or to another recipient designated by the operator of the cable TV system. The invention relates to emergency notification systems and to systems for communicating emergency messages to subscribers to cable television distribution networks, as well as to non-subscribers.

United States Patent Publication No. 20040181811 to Rakib published on Sep. 16, 2004 entitled "Thin DOCSIS in-band management for interactive HFC service delivery" discloses circuitry and process for transmitting video-on-demand and interactive service data and other service data on an MPEG multiplex and sending management and control data including conditional access The management and control data can include requested application software for download to the STBs, requested program guide data, conditional access key data such as EMM messages, event provisioning data, emergency alert service data, and messages to manage and control the interactive and VOD services, and targeted advertising, etc.

United States Patent Publication No. 20050015799 to Park published Jan. 20, 2005 entitled "Apparatus and method for displaying out-of-band (OOB) channel information in open cable system" discloses an apparatus and a method for displaying out-of-band information without turning on a TV or set-top box in an open cable system. A receiving unit receives an out-of-band signal transmitted from a headend and parses the signal. A storage unit stores the parsed data and a user's display setting. A processing unit loads the user's display setting from the storage unit and processes the data according to the user's display setting. A control unit further processes the processed data and causes the further processed data to be displayed on an auxiliary display or main display, wherein the auxiliary display displays the further processed data in a stand-by mode state. The OOB signal may contain an electronic program guide (EPG), impulse-pay-per-view (IPPV), Data, an emergency alert system (EAS), video on demand (VOD), web, e-mail information and the like.

United States Patent Publication No. 20050151639 to Bulmer published Jul. 14, 2005 entitled "Alert System" discloses a system for alerting the public regarding a criminal act; a plurality of law enforcements modes which generate alerts related to a criminal or emergency issue and transmit the same to a central server; a central server system including an administration workstation and database for receiving the alerts and creating broadcast messages; and a broadcast system associated with the central server for broadcasting an alert via a televised broadcast, internet transmission or satellite transmission.

United States Patent Publication No. 20050162267 to Khandelwal, et al. published on Jul. 28, 2005 and entitled "Emergency alert service" discloses an emergency alert service that responds to receipt of emergency alert messages by filtering, formatting and routing emergency alert information to a variety of different networked appliances (and also to remote devices). In this way, a consistent warning message is disseminated simultaneously over many different warning systems, thus increasing warning effectiveness while simplifying the warning task. The system thus provides a common alerting protocol that is capable of exchanging all-hazard emergency alerts and public warnings over different kinds of networks.

United States Patent Publication No. 20050198684 to Stone, et al. published Sep. 8, 2005 entitled "Method and apparatus for providing a DSG to an OOB transcoder" discloses a method and apparatus for providing a DOCSIS Set-top Gateway (DSG) to OOB transcoder in a cable television system comprising a legacy set-top device. In the first embodiment, a one-way DSG to OOB transcoder acts as a proxy device for OOB messages to the DSG tunnel. These OOB messages may include messages containing system information, emergency alert information, and conditional access information. These set-top devices equipped with one or more DOCSIS tuners are referred to as "DSG compatible" set-top devices. Once an OOB message is generated, the OOB message is transmitted to the DSG tunnel. The DSG to OOB transcoder of the present invention then captures the OOB message, and communicates the OOB message to the legacy set-top device. In a second embodiment of the invention, the legacy set-top device may communicate return communications to the DSG to OOB transcoder by generating a QPSK message. The QPSK message is then translated to an OOB message comprising DOCSIS content.

"Digicable" is another prior art system supplied by General Instrument (Motorola) for end-to-end satellite and cable system distribution networks. It uses an out-of-band data channel to deliver common system information associated with all in-band channels. Out-of-band traffic in these systems included: Entitlement Management Messages (EMM) addressed to individual STBs and carrying conditional access secure authorization instructions for requested services; Service Information that supports the STB navigation application with information about the requested service; program guide information to display what is on the various channels at various times; an Emergency Alert System messages to cause the STB to display a text message, play an audio message or force tuning to an alert channel.

From the foregoing, it is clear that while the prior art has generally recognized the need to receive and provide EAS data to client devices over analog networks, and to enable EAS decode and display capability compatible with an audio/video decoder on a client device, it fails to address several issues pertaining to IPTV deployments. For example, when EAS data is embedded with packets belonging to a particular video format, decoders that wish to receive video in another format cannot make use of this EAS data stream. This requires that the IPTV operator repeat EAS data for each different video format anticipated in the network.

Moreover, the prior art fails to make effective use of the pervasive connectivity of an IP network to distribute various functions of EAS data reception, formatting, streaming, service authentication etc. across multiple servers located at different locations and communicating with each other over the IP network.

Accordingly, what is needed are apparatus and methods that provide a mechanism for receiving multiple channels of baseband video in real-time from the content providers (typically received via satellite or some local origination source) while also providing for the capability to receive and deliver emergency alert data in multiple forms (i.e., audio, video, and text data) to the end-user's client device application for display and presentation. Such apparatus and methods should be preferably deployable over a packet-switched network (such as an IP network), such that subscribers can use the service by using commonly available PC or similar software applications. They should also be able to localize or regionalize the delivery of the EAS data (e.g., by zip code or some other geographic metric), and substantially pre-empt at least portions of ongoing programming so that the emergency alert data is clearly and unequivocally communicated to the targeted subscriber base. Lastly, these methods and apparatus would require only minimal changes to existing systems, thereby leveraging the installed infrastructure as much as possible.

SUMMARY OF THE INVENTION

The present invention addresses the foregoing needs by providing, in various embodiments, methods and apparatus for providing EAS data over networks such as IPTV networks.

In a first aspect of the invention, a system for distribution of both media content and emergency alert information over a network is disclosed. In one embodiment, the network comprises a packet-switched network, and the system comprises: a content source adapted to generate media content; a receiver adapted to receive emergency alert information, the alert information comprising at least video and at least one of audio or text; an emergency alert server in data communication with the receiver and adapted to generate alert data relating to the alert information, the alert data comprising at least one alert video stream; a video streaming server in data communication with the content source; and at least one client device in data communication with the streaming server and the alert server, the at least one client device configured to receive at least the media content from the streaming server and the emergency alert data from the alert server, and display the alert data according to a prescribed protocol, the protocol including at least temporarily tuning the client device to receive the at least one alert video stream.

In a second aspect of the invention, a method of delivering alert data over a network is disclosed. In one embodiment, the network comprises a packet-switched network comprising at least one multimedia server configured to send multimedia programs, at least one data server different from the multimedia server configured to send alert data, and a plurality of client devices in direct or indirect signal communication with the servers, an the method comprises: receiving the alert data from one or more alert sources; formatting the alert data in a format suitable for transport over the network; delivering the alert data to the one or more client devices over the network; and causing the client devices to: display at least a first portion of the alert data on a display device associated with respective ones of the client devices; and present an audio portion of the alert data in place of the audio of at least one of the multimedia programs.

In a second embodiment, the method comprises: receiving the one or more emergency alerts from the one or more alert broadcast sources; formatting the one or more alerts into the alert data having a format suitable for transport over the packet-switched network; delivering the one or more multimedia programs to the one or more client devices over a first transport stream associated with a first process running on the one or more client devices; and delivering the alert data to the one or more client devices over a second transport stream different from the first and associated with a second process running on the same ones of the one or more client devices on which the first process is running.

In a third aspect of the invention, consumer equipment adapted for use within an IPTV network is disclosed. In one embodiment, the equipment comprises: a multimedia content decoder and display unit; a computer program configured to receive and decode emergency alert data; a computer program configured to display the decoded alert data; a computer program configured to substantially preempt an audio portion of a multimedia program stream being decoded and displayed on the consumer equipment; and a computer program configured to tune the consumer equipment to a second program stream containing emergency alert video content.

In a fourth aspect of the invention, network server apparatus for use in a network is disclosed. In one embodiment, the network comprises an IPTV broadcast network having a plurality of client devices, and the apparatus comprises: a receiver unit configured to receive emergency alert data from incoming broadcast signals; a formatting unit configured to process the alert data to place it in a format suitable for transmission over the IPTV network; and a delivery unit configured to deliver the alert data on the IPTV network to the client devices. In one variant, the alert data comprises video, text, and audio alert data, and the apparatus is further configured to selectively transmit video alert data to subscribers of the IPTV network via a packet stream different than a packet stream carrying the audio and/or text alert data.

In a fifth aspect of the invention, apparatus capable of selectively providing emergency alert data to a plurality of client devices receiving content transmitted over a packet-switched network is disclosed. In one embodiment, the apparatus comprises: a processor adapted to run at least one computer program thereon, the processor further being adapted to access a storage device in data communication with the processor, the storage device storing a plurality of data relating to individual ones of the plurality of client devices; and a computer program running on the processor and adapted to selectively cause transmission of the emergency alert data to groups of the plurality of client devices based at least in part on the plurality of data. In one variant, the alert data comprises video, text, and audio alert data, and the apparatus is further configured to selectively transmit video alert data to subscribers of the packet-switched network via a packet stream different than a packet stream carrying the audio and/ or text alert data.

In a sixth aspect of the invention, a method of operating content-based network is disclosed. In one embodiment, the network comprises at least one server and a plurality of consumer premises equipment (CPE) in direct or indirect signal communication therewith, and the method comprises: providing emergency alert data services to a plurality of subscribers associated with respective ones of the plurality of CPE; causing each of the CPE to possess an identifying parameter; receiving emergency alert data to be delivered to one or more of the CPE; and selectively delivering the emergency alert data to the one or more CPE, the selective delivery based at least in part on the identifying parameter. In one variant, the content-based network comprises an IPTV network, the IPTV network being comprised of at least portions of an HFC cable or satellite network. An IP transport mechanism is provided, and the direct or indirect communication comprises data communication via a cable modem of an HFC network.

In a seventh aspect of the invention, a method of doing business in a content-based network is disclosed. In one embodiment, the network comprises at least one server and a plurality of consumer premises equipment (CPE) in direct or indirect signal communication therewith, and the method comprises: providing emergency alert data services to a plurality of subscribers associated with respective ones of the plurality of CPE; causing each of the CPE to possess an identifying parameter; receiving emergency alert data to be delivered to one or more of the CPE; delivering the emergency alert data to subscribers; and selectively providing related services to one or more of the subscribers, the act of selectively providing being based at least in part on the identifying parameter. In one variant, the related services are contextually related to at least one aspect of the content of the alert data, and the act of selectively providing is performed using an IP-based transport mechanism via the cable modem.

In an eighth aspect of the invention, a method of providing primary content, emergency-related secondary content, and contextually-related tertiary content to users of a content-based network is disclosed. In one embodiment, the network comprises a server and a client device in data communication therewith, and the method comprises: delivering the primary content to the client device; delivering the secondary content to the client device; accessing a descriptive data file associated with the secondary content in order to obtain descriptive data therefrom, the descriptive data relating to at least one aspect of the emergency-related content; providing the descriptive data to a processing entity to identify contextually related tertiary content; transmitting the secondary and tertiary content to the consumer premises device over a network; and selectively displaying the primary content and at least one of the secondary and tertiary content on a display device associated with the client device.

DETAILED DESCRIPTION OF THE INVENTION

Figure 1:
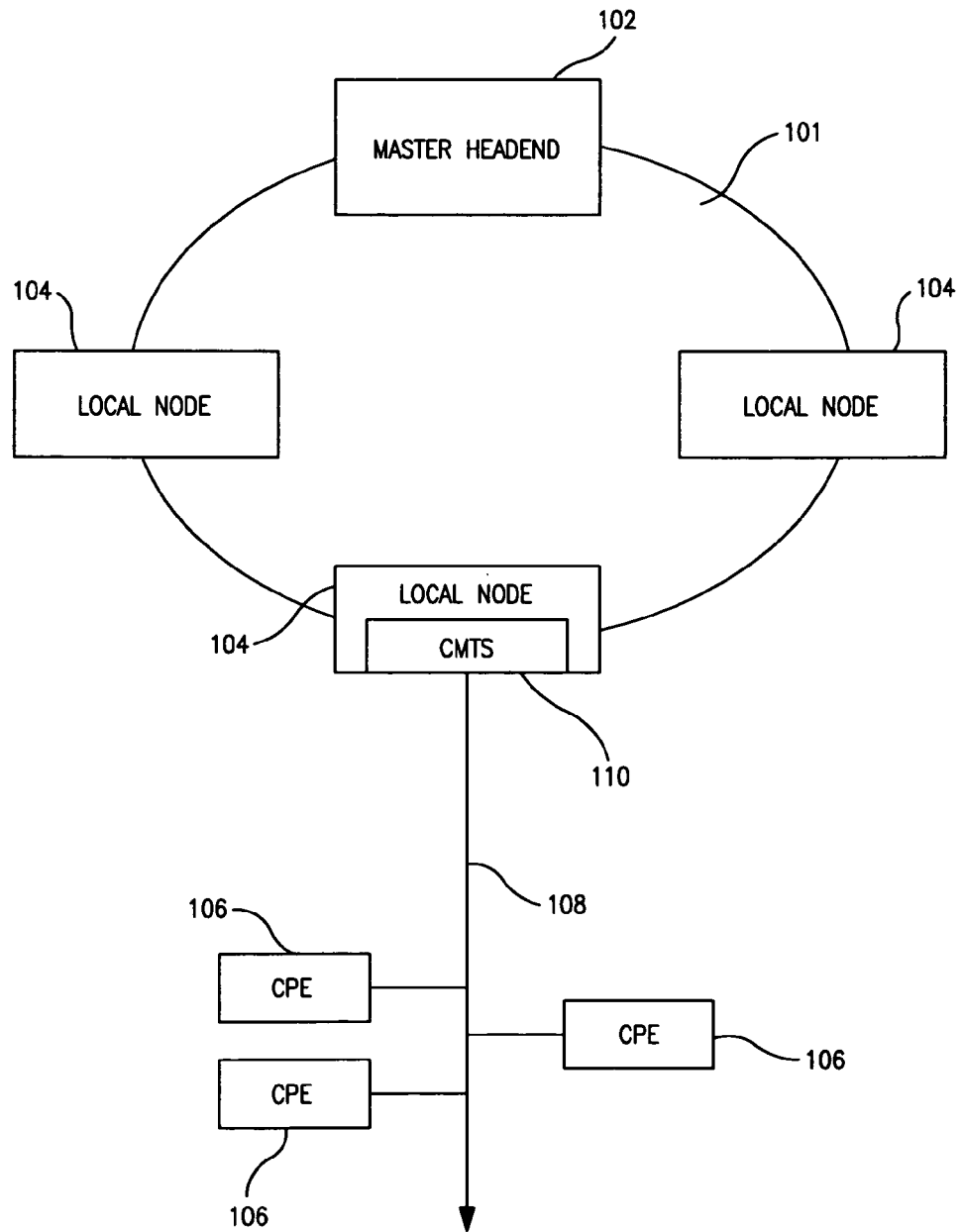
FIG. 1 is a functional block diagram illustrating an exemplary content-based (e.g., cable) network configuration useful with the present invention.

Reference is now made to the drawings wherein like numerals refer to like parts throughout.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, TCP/IP, SIP, UDP, FTP, RTP/RTCP, H.323, etc.).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the terms "client device" and "end user device" include, but are not limited to, personal computers (PCs) and minicomputers, whether desktop, laptop, or otherwise, set-top boxes such as the Motorola DCT2XXX/5XXX and Scientific Atlanta Explorer 2XXX/3XXX/4XXX/6XXX/8XXX series digital devices, personal digital assistants (PDAs) such as the "Palm®" family of devices, handheld computers, personal communicators such as the Motorola Accompli or V710, J2ME equipped devices, cellular telephones, wireless nodes, or literally any other device capable of interchanging data with a network.

Similarly, the terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes, televisions, Digital Video Recorders (DVR), gateway storage devices (Furnace), and ITV Personal Computers.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the term "computer program" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "component" in the context of software refers generally to a unit or portion of executable software that is based on a related set of functionalities. For example, a component could be a single class in Java™ or C++. Similarly, the term "module" refers generally to a loosely coupled yet functionally related set of components.

As used herein, the term "server" refers to any computerized component, system or entity regardless of form which is adapted to provide data, files, applications, content, or other services to one or more other devices or entities on a computer network.

As used herein, the terms "emergency alert system (EAS)", "alert data", "emergency alert (EA)", and "emergency broadcast system" refer to, without limitation, the generation and/or delivery of text, audio, and/or visual or video information relating to events, alerts or emergency situations.

As used herein, the terms "closed captioning" "caption data" or "CC data" are used to refer to, without limitation, the transcription of audio programs, as well as extended data services and VBI data/test signals, and delivering information such as metadata associated with a television program (including inter alia providing URLs for selective advertising, Really Simple Syndication (RSS) feed information related to video programs, news clips, stock, weather data, etc.

As used herein, the term "DOCSIS" refers to any of the existing or planned variants of the Data Over Cable Services Interface Specification, including for example DOCSIS versions 1.0, 1.1 and 2.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

Overview

In one aspect of the invention, methods and apparatus for receiving, transmitting and displaying emergency alert system (EAS) data (audio, video, and/or text) in a network environment are disclosed. In an exemplary embodiment, the network environment comprises an Internet Protocol Television (IPTV) System, and/or system for television broadcast over a broadband connection. The data from an incoming EAS feed is passed to an EAS server for formatting and optional localization (targeting based on geography or other parameters). If the data is audio and/or text, then it is formatted into a message to be sent over the IP network. The message is then received by the client device(s), which may comprise for example an IP-enable DSTB, or a personal computer, including their EAS client application.

Once the EAS client receives the message, it is then displayed in a new window and/or overlay of the current video stream being displayed. Also, the EAS client generates an audio transmission based on the received EAS message that will pre-empt the audio track of the current program stream. The text and audio can be repeated as many times as mandated by government regulation, or based on another criterion. Advantageously, in the exemplary embodiment, any device connected to the network that is viewing any program stream will receive the EAS message. In alternate embodiments (e.g., those using an Instant Messenger or comparable delivery method for the EAS data), the EAS data will be independent of the program stream.

In the event that the EAS feed includes video content, the system also "force-tunes" the EAS client application via a message sent from e.g., the EAS server. The message sent instructs the client video player to tune to an appropriate broadcast, unicast, or multicast IP video stream to display the EAS video on the client device. The player displays the force-tuned EAS stream until the EAS transmission has ended, at which point the video client will then re-establish the display of the previously tuned IP video stream.

The invention overcomes the deficiencies in the prior art relating to the lack of EAS decoding and display capability in the video decoder programs of typical client devices (e.g., PCs).

The invention also advantageously provides for reuse of existing equipment intended for delivery of content over the packet-switched network for emergency alert functions. In this fashion, no new infrastructure or significant upgrades are required to implement the invention. Exemplary embodiments of the invention comprise a client software stack that can function both with legacy IPTV video decoder applications and legacy IM infrastructure, or alternatively as an integrated application that performs video decoder plus closed-captioning plus emergency alert display and presentation functions. However, literally any type of internet/network messaging can be used as the basis for sending EAS-related content or messages.

The invention also provides strong authentication, using for example the DOCSIS infrastructure of the parent HFC network. Since the network operator controls both ingress point (e.g., the CMTS) of the EAS data, as well as the egress point (e.g., cable modem), appropriate security measures such as firewalls and DOCSIS traffic-based security can be taken to prevent "hijacking", hacking or other surreptitious activities aimed at corrupting or misusing the data or communication channel(s).

DETAILED DESCRIPTION OF EXEMPLARY EMBODIMENTS

Exemplary embodiments of the apparatus and methods of the present invention are now described in detail. While these exemplary embodiments are described in the context of the previously mentioned DOCSIS hybrid fiber coax (HFC) cable architecture, the general principles and advantages of the invention may be extended to other types of networks and architectures where delivery of captioned information or data is required or desirable. Such other networks or architectures may be broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system or over future satellite or millimeter wave-based network having two-way capabilities similar to today's digital cable HFC networks.

It will also be appreciated that while described generally in the context of a network providing service to a customer or consumer (i.e., residential) end user domain, the present invention may be readily adapted to other types of environments including, e.g., commercial/enterprise, and government/military applications. Myriad other applications are possible.

Network-Side Architecture—

Referring now to FIG. 1, an exemplary data-over-cable (DOCSIS) network 100, including broadcast IPTV service, is shown. For clarity of illustration, some details of the network not pertinent to the present invention have been omitted from FIG. 1. A "master" head-end 102 is connected with one or more local nodes 104 via a network 100. The network 100 could for example comprise an optical fiber network of the type known in the art using dense wave-division multiplexing (DWDM), Synchronous Optical Network (SONET) transport technology or gigabit Ethernet transport. In the downstream direction (from the head-end servers or nodes to the CPE 106), this network performs the function of carrying digital and analog television signals as well as packetized data (e.g., IP) traffic. A cable modem termination system (CMTS) 110 located at a local node 104 provides connectivity to the CPE 106 via the coaxial drop 108. The CMTS interfaces 110 in turn are connected directly or indirectly to the Internet or IP backbone, thereby providing access for the CPE 106 to the Internet (or other internets, intranets, or networks) via the cable network infrastructure. Aggregation of television programs that include local and regional programming, or other types of content, occurs at the head-end 102, where these programs are converted into a suitable transport format and a "channel line-up" is created for delivery to the downstream CPE 106.

Figure 1A:
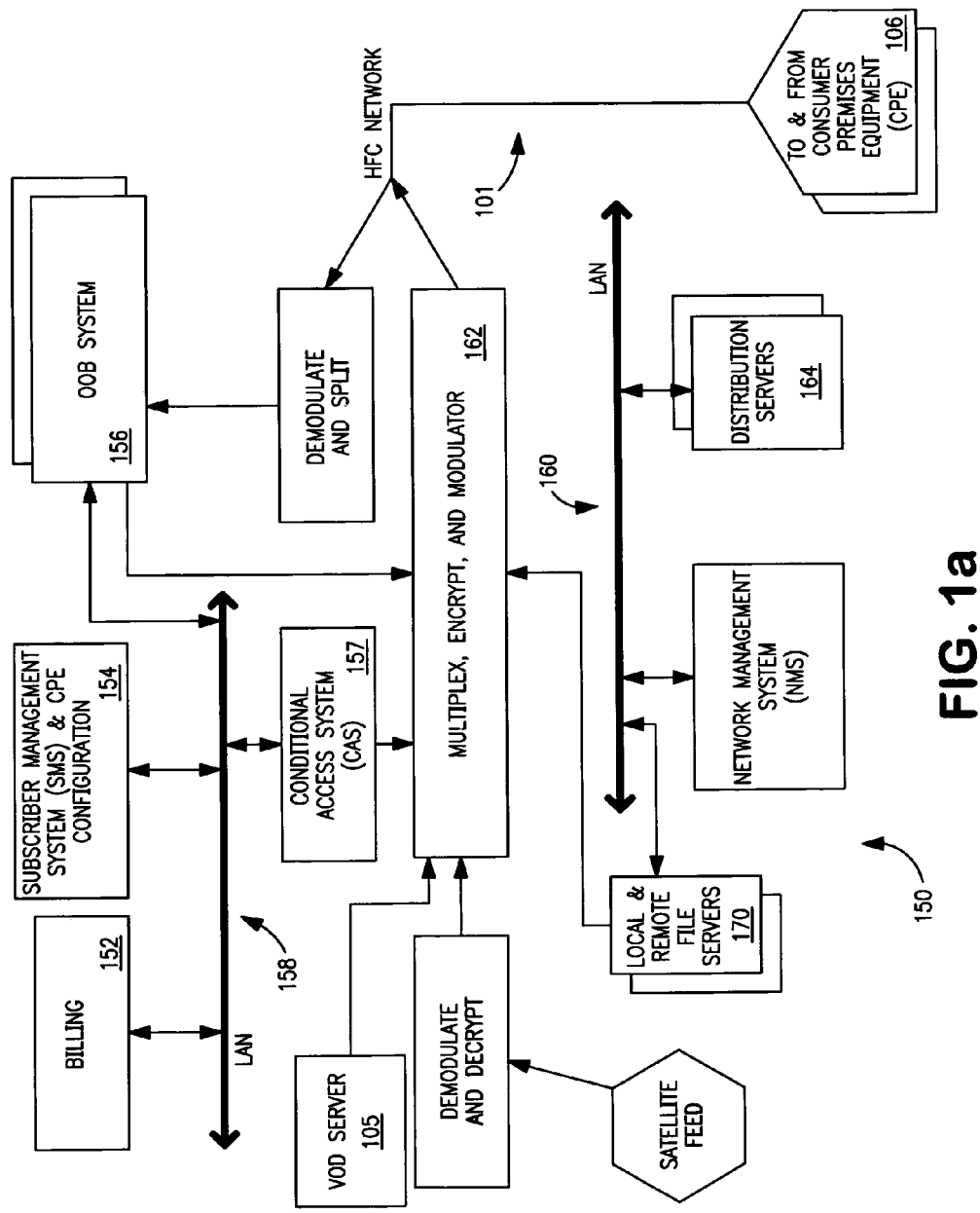
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. The head-end architecture 150 may also include a cable-modem termination system (CMTS) if desired.

It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0 (and subsequent) specification provides for exemplary networking protocols both downstream and upstream, although the invention is in no way limited to these exemplary approaches.

Figure 2:
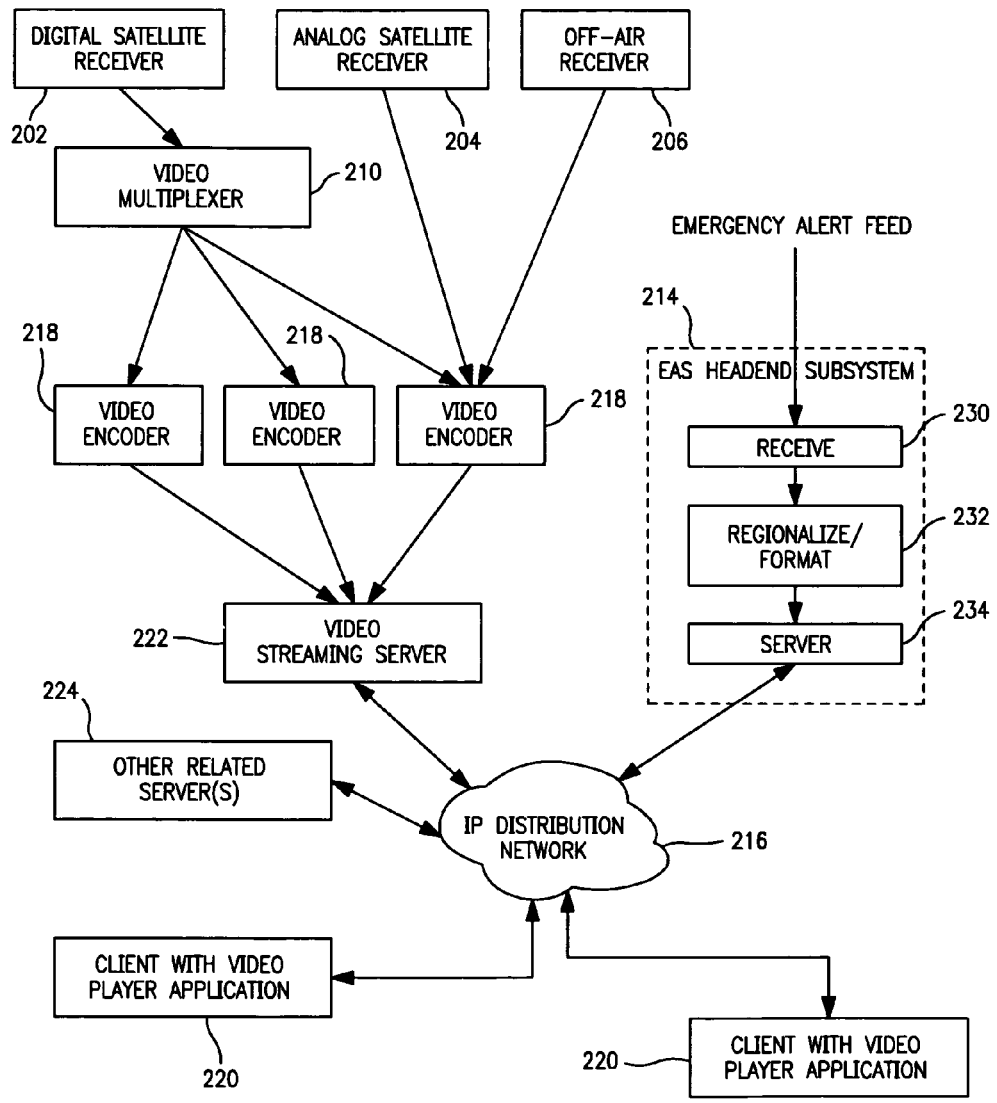
FIG. 2 is a functional block diagram illustrating one exemplary packet-switched distribution network that useful with the present invention.

Referring now to FIG. 2, an exemplary configuration of a packet-switched network useful with the present invention is illustrated. While described in the context of an Internet Protocol Television (IPTV) network, it will be recognized that the principles of the invention can be extended to other transport modalities and network paradigms.

The network 200 of FIG. 2 effectively operates logically "along side" the in-band content delivery system described with respect to FIG. 1a, and shares many common elements. It includes digital satellite receivers 202, analog satellite receivers 204 and off-air receivers 206 deployed within the cable network in order to receive content such as broadcast television programs. This content is then distributed over the cable network. With respect to the IPTV network, the digital satellite feed received via the receiver 202 is sent to a video multiplexer 210 that provides one or more digital programs to one or more video encoders 218 to transcode/transrate or otherwise process incoming digital video streams to a format suitable for loading onto the video streaming server 222.

An Emergency Alert Service (EAS) head-end server subsystem 214 is shown to operate in conjunction with the in-band and IPTV content systems described above. This subsystem includes a receiver 230 responsible for receiving emergency alert messages from message feeds (e.g., in the form of RF communications on government designated disaster message broadcast frequencies), or by other means. The messages or data thus received are converted into a digital data format suitable for transmission over the IPTV network using a formatting unit 232. The formatting unit 232 also optionally regionalizes or localizes the data to allow for "targeted" delivery as discussed in greater detail subsequently herein. Note that in FIG. 2, while localization and formatting are shown as a single logical functional block, actual implementations of these functions may be on separate (and even disparate) platforms.

The subsystem 214 also contains one or more servers 234 that operate in conjunction with other servers in the network, in a manner described further herein, in order to transmit emergency messages/content to the client devices 220 over the interposed IP distribution network 216.

The video streaming server 222 and the EAS message server 234 are in turn connected to the IP Distribution Network 216 (which in the context of a cable network, may comprise, inter alia, the coaxial "drop" 108 of FIG. 1 between the CPE 106 and CMTS 110). Other architectural elements connected to the IP distribution network 216 are shown as "other related servers" 224 in FIG. 2. Client devices 220 (such as PCs connected to cable modems) are connected to the IP distribution network and perform the functions of, inter alia, decoding and displaying video and EAS signals.

It will be appreciated that several different embodiments of the above-described IPTV network are possible consistent with the present invention. For example, the video encoders 218 shown in FIG. 2 may be configured to produce one or more bit streams for the same content. Such bit streams could have different bit rates as a function of suitability for transmission over the IP network (e.g., low, medium and high bitrate streams for dial-up, DSL and cable modem IP networks), and/or different encoding formats conforming to audio/video encoding standards such as Real or MPEG or Windows Media Player (WMP). Similarly, the EAS head-end server subsystem 214 could serve the emergency messages or content to the client devices in unicast, multicast or broadcast manner.

It is noted that while localization of emergency messages or video is a highly desired feature, this feature may be omitted or obviated in certain applications, such as when all client devices that a given head-end is serving are in the same emergency alert area. Also, the placement of the localization function within the network can be varied; i.e., either (i) only at the head-end 150, (ii) partly at the head-end and partly at the client devices 220, or (iii) exclusively at the client devices 220.

Furthermore, the emergency alert data received by the network are typically made available by governmental agencies by broadcasting them at pre-designated frequency over the air. In some implementations of content distribution networks, these messages may be received in one location within the network, and carried over another medium (e.g., fiber optic transmission) to other head-ends or nodes of the network. In such embodiments, the EAS receiver 230 may not contain an explicit over-the-air receiver, but still receive such messages.

Emergency Alert Service Subsystem—

Figure 2A:
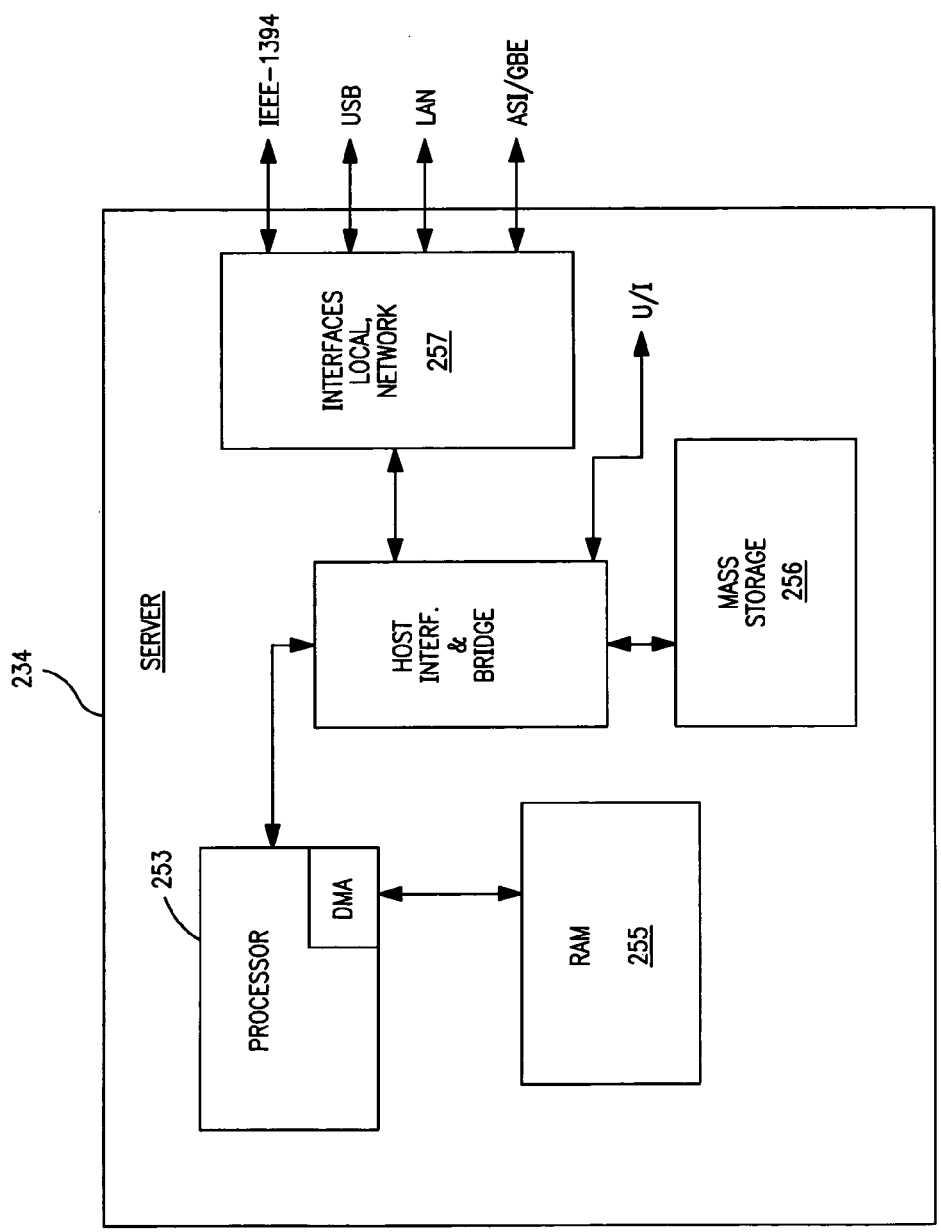
FIG. 2a is a functional block diagram illustrating an exemplary network EAS server device according to the invention.

Referring now to FIG. 2*a*, one embodiment of the emergency alert subsystem 214 (comprising a network EAS server device 234 with EAS receiver and formatting unit 232) according to the present invention is described. As shown in FIG. 2*a*, the exemplary server subsystem 214 generally comprises an IP-based server module including a digital processor(s) 253, RAM 255, mass storage device 256, and a plurality of interfaces 257 for connection with other network apparatus such as LANs, the local service node hardware, IP routers and other packet network devices, network management and provisioning systems, local PCs, etc. Other components which may be utilized within the server subsystem 214 (depending on where it is employed and how it is physically implemented) include RF or satellite receivers (for receiving the EAS data feed from the source), encoders/decoders, encryption/decryption and/or error correction algorithms, board level electronic components, as well as media processors and other specialized SoC or ASIC devices. Support for various processing layers and protocols (e.g., 802.3, SNMP, UDP, SNMP, H.323/RTP/RTCP, VoIP, SIP, etc.) may also be provided as required. The server subsystem 214 may also include a metadata "packager", such as for packaging extracted EAS data in an XML or other comparable format within a metadata file as discussed subsequently herein.

The server 214 of FIG. 2*a* may take any number of physical forms, comprising for example one of a plurality of discrete modules or cards within a head-end component of the type well known in the art. The server may also comprise firmware, either alone or in combination with other hardware/software components such as those previously described. Alternatively, the server module 214 may be a stand-alone device disposed at the head-end, a hub, or other location. The server device 214 may also be integrated with other types of components (such as video transceivers, encoders/decoders, etc.) and form factors if desired.

It will be appreciated that while described in the context of separate server disposed at the head-end 150 of the network as shown in FIG. 2, the EAS subsystem 214 may be adapted for use at other locations within the network. Furthermore, the receiver, formatting, and server functions 230, 232, 234 may comprise a distributed software and/or hardware architecture, such as where the aforementioned functions comprise two or more portions of a distributed application (DA) in communication with one another yet running on different physical devices. Many such permutations and alternate configurations will be recognized by those of ordinary skill given the present disclosure.

Server/Client Interaction—

In conventional broadcast television systems, EAS alert information is typically viewed in a non-discretionary fashion. That is, the information typically will preempt at least portions of both the video and audio portions of a given program.

While the present invention can be implemented in the context of the one-way or "broadcast" model as described above by delivering EAS data irrespective of the program or content the targeted subscribers are each viewing, it also optionally makes advantageous use of the availability of two-way communication in an IPTV network. Interaction between client devices (e.g., PCs) and EAS servers in such a network can be further used for various ancillary or related functions including, inter alia, enforcement of service classes (by verifying whether a user is entitled to receive certain premium or advanced functions), profiling of the client device 220 to advise the EAS servers of the client device capabilities, providing the appropriate EAS data to a client device (the right bitrate and format), and so forth.

Client/server interaction may also be performed pursuant to verifying the authenticity (i.e., authentication or identification) of a client device/EAS software process or its user, or alternatively an EAS server. This approach frustrates surreptitious attempts to either "spoof" the client devices via a false EAS server, or engage the EAS server in a false message exchange (and delivery of EAS data content) by using a spoofed client device. Furthermore, while EAS transmissions are mandated by Federal Government regulations in the United States, other type of data may be delivered that a service provider may only be made available to subscribers of a particular service tier or group, as subsequently described herein The client/server relationship may also be used for purposes of redundancy; e.g., where the client device 220 is alerted to an incoming EAS message, yet does not receive it, or cannot successfully negotiate for delivery of the EAS message, and hence must be re-directed to a second or alternate server.

Client-Side Architecture—

Figure 2B:
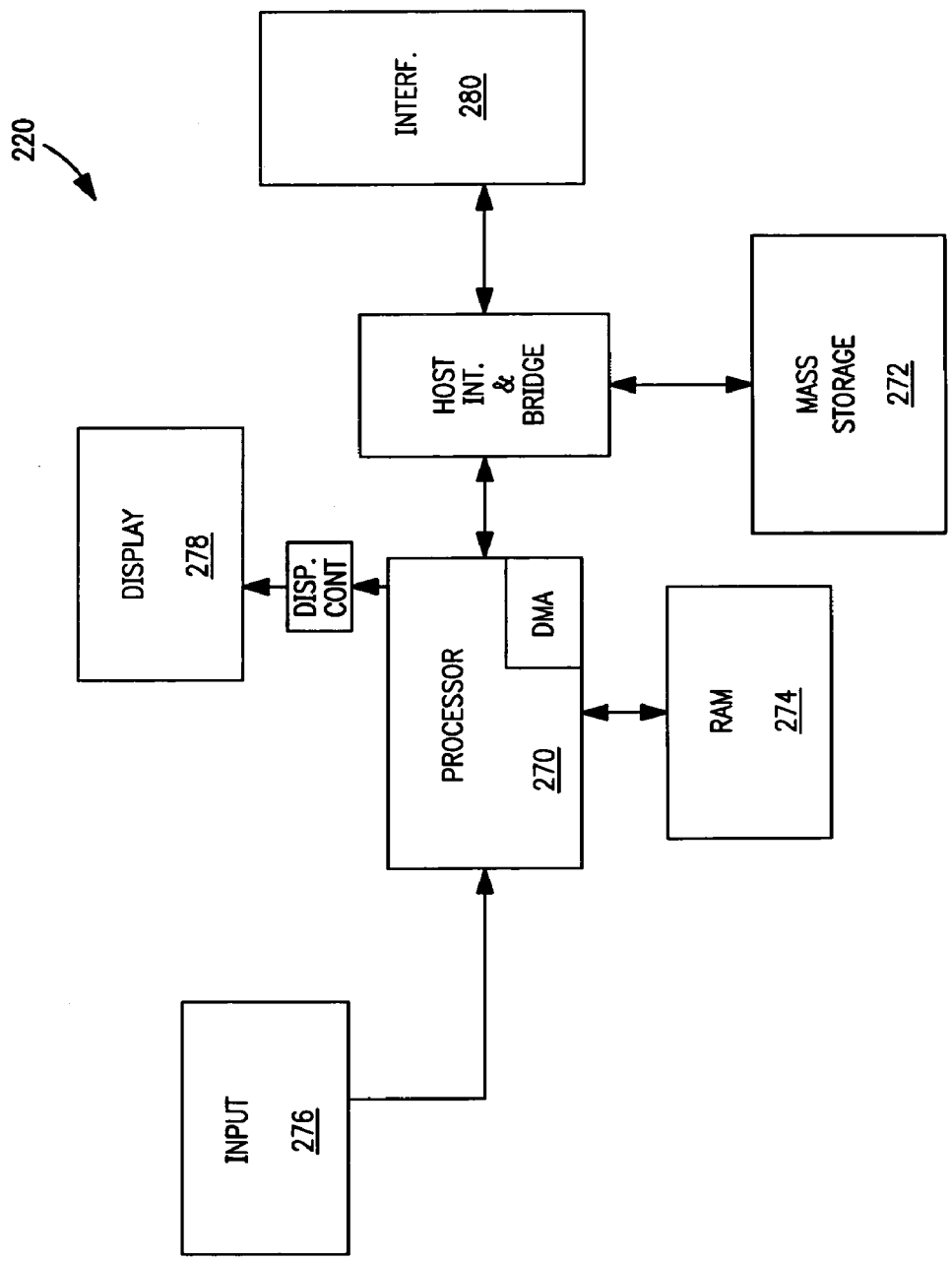
FIG. 2b is a functional block diagram illustrating an exemplary client device adapted for EAS data receipt and display, according to the invention.

Referring now to FIG. 2*b*, one exemplary embodiment of the client device 220 of FIG. 2 is described in detail. A client device 220 in the context of the present invention generally comprises a personal computer (PC) or similar computerized device running, e.g., a Linux™ or Windows® operating system. As is well known, the client device 220 includes a computer processor 270, mass storage 272, RAM 274, input device 276, display device 278, and communications interfaces 280 including for example an RJ-45 LAN connector with Ethernet LAN card, USB ports, IEEE-1394 "Firewire" interface, wireless interface (such as 802.11 LAN card, WiMAX 802.16 interface, 802.15 PAN interface, or Bluetooth interface), and so forth. Computerized systems (whether stationary or mobile) are well known to those of ordinary skill and accordingly not described further herein.

The client device 220 (which may also be integrated, or in communication with, the CPE 106 of FIG. 1) may also include an external or internal modem to achieve connectivity to the network. For example, it is customary to connect the Ethernet port of a PC to an Ethernet output of a cable modem (CM) that itself is connected to a coaxial cable (e.g., DOC- SIS) data network. The PC in this case is logically connected to the network side servers via an IP logical (and physical) channel established though the cable modem. In many existing personal computers connected to IP networks, an audio/video decoder (such as the ubiquitous Windows Media Player, Apple QuickTime™ or Real Video) is readily available on the client device, or easily downloaded thereto. However, such decoders lack support to display EAS message data obtained from an IP stream different than the video stream.

As discussed subsequently herein, another application ubiquitously available on such client platforms is an "Instant Messenger" program such as the America Online (AOL) Instant Messenger (AIM) or Yahoo! Messenger or MSN Messenger. The construction and operation of these applications are well known to those of ordinary skill, and accordingly not described further herein.

In an exemplary embodiment of the present invention, a dedicated EAS client application is implemented to receive/decode/display both video EAS data (e.g., video delivered over a packet stream flow via the streaming server) and the EAS audio/text data (delivered by the EAS server subsystem 214). In another exemplary embodiment, the client-side implementation makes use of existing decoder software (e.g., Real decoder) and an IM client program to display EAS video and present audio/text data, respectively. In yet another variation, the previous embodiment is further extended by using the IM client software and a corresponding IM server to authenticate a user.

Popular audio/video client software programs such as Windows Media Player™, Apple QuickTime™ or Real™ Video cannot receive and display Emergency Alert messages. As discussed in greater detail elsewhere herein, the present invention envisions client-side implementations that either complement such widely available video clients by providing a secondary application that runs in conjunction with the video decoders, or a more client unitary application program that implements both video decoder and emergency alert audio/text presentation functions (and optionally instant messaging or IM functionality). Accordingly, the term "EAS client process" and the like encompasses all implementations ranging from discrete software components through a fully integrated solution.

The EAS client 400 of the exemplary embodiment is also configured to switch the client device back to its original program stream (if switched away) and cease the EAS audio data insertion, as well as removing the display text window or overlay. Therefore, as soon as the federal or other requirements for display have been met, the system can advantageously "return to normal" in a seamless fashion without requiring subscriber retuning or intervention. The automatic retuning can be locally initiated (e.g., by the EAS client process 400 invoking a re-tune event based on, for example, expiration of a timer variable), or alternatively via remote messaging (e.g., from the EAS server to the client process 400 indicating that the EAS alert is complete). Myriad other mechanisms for reverting the client device (and video player) to their original or pre-alert state will be recognized by those of ordinary skill given the present disclosure, and hence are not described further herein.

Localization of Emergency Alert Messages—

Localization refers to "editing" the emergency alert messages or data received by the network operator such that the appropriate subset of client devices to whom the message may be applicable is able to receive and decode it, while other client devices are able to discern that the emergency alert message is not targeted for them. For example, the emergency alert message specification for cable broadcast (ANSI standard J-STD-042-2002, incorporated herein by reference in its entirety) describes localization in the form of county code and subdivision.

In an IPTV deployment such as one implemented over a cable data network, the locations of modems to which EAS clients are attached is available at a network-side server. This may comprise, for example, a MAC address or device ID associated with a given cable modem. Furthermore, "ranging" information may be used to validate an installation of a premises device, based on expected signal propagation delays (thereby telling the network operator when the device has been moved to another location within the network). Such information can be taken advantage of when formatting the EAS messages for targeting a specific subset of client devices. Hence, the present invention affords significant capability in terms of tailoring the delivery of EAS messages to particular groups of subscribers. For example, the MSO may maintain a database of cable modem device IDs or MAC addresses and a corresponding postal zip code for each such modem. When an tornado alert message is issued by NWS for certain counties or zip codes, the MSO can rapidly access this database to determine which device IDs/MAC addresses to which to route the EAS message. Certain zip codes may merit a first type of message (e.g., critical warning) while others may merit a less dire alert.

It will be appreciated that information other than zip code can be used as well (or in conjunction) as a basis for differentiating message delivery and/or content, such as e.g., subscriber latitude/longitude, street address, elevation above sea level, etc. For example, commercially available software packages are capable of mapping given street addresses to an elevation map, earthquake/fault/liquefaction map, etc. Hence, the MSO could feasibly pre-store such information for each device ID/MAC address, and hence tailor the alert warnings for a heavy rain storm primarily to low-lying areas. Myriad other such "tailoring" approaches are possible according to the present invention.

Figure 3:
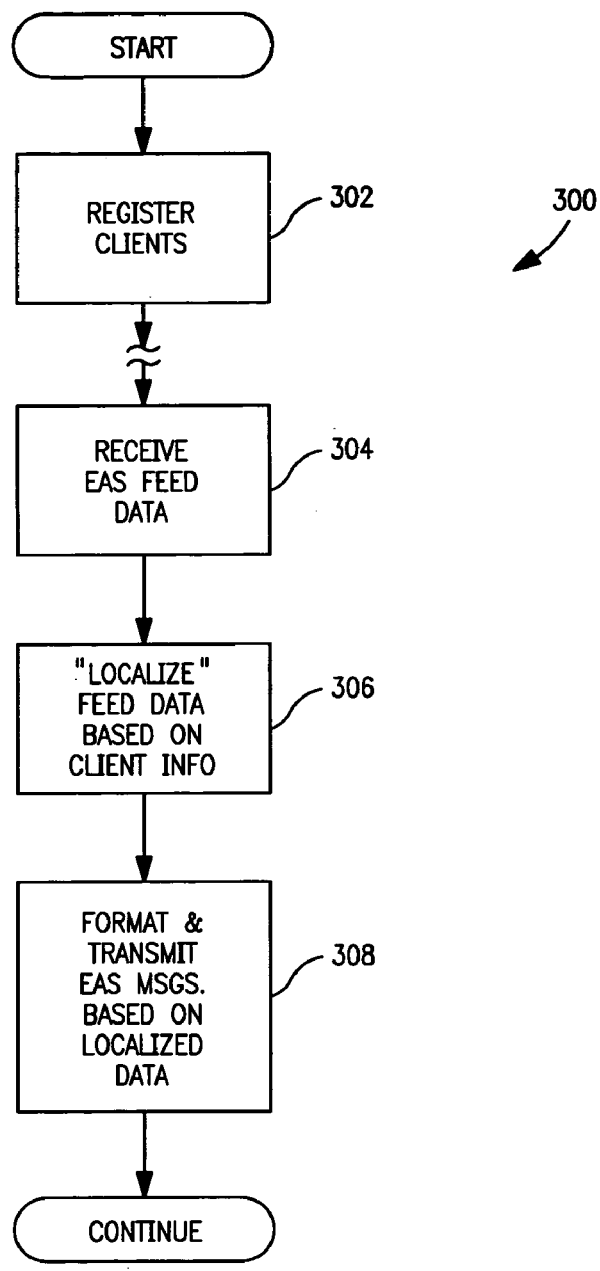
FIG. 3 is a logical flowchart illustrating one embodiment of the method of EAS data localization according to the invention.

FIG. 3 illustrates an exemplary method of performing client localization for EAS data delivery according to the invention. As shown, the first step 302 of the method 300 comprises registering new network (e.g., IPTV) clients within the database. This registration can include zip code or other such relevant information as previously described, which allows for targeted delivery of EAS data to selected subscribers.

Next, the EAS subsystem 214 receives the EAS feed information, such as that relating to a natural disaster (step 304). The localization and formatting unit 232 of the server system 214 then performs localization using the information present in the client database per step 306. This localization may comprise for example specifying the MAC addresses or Device ID values for each of the cable modems associated with the targeted subscriber base.

Lastly, per step 308, the localization data is used to transmit (e.g., broadcast, unicast, or multicast) the relevant EAS data to the targeted client devices 220 from the server subsystem 214.

Authentication of Emergency Alert Messages—

The intended end effect of an emergency alert message on a client device is disruptive to the viewing of audio/video program by the user (i.e., "forced" viewing/hearing of the alert message in whatever form it is delivered). Accordingly, when invoked, the EAS delivery system will preempt (or at very least significantly detract from) all other modalities of content delivery. It is therefore critical to provide a method and apparatus that is robust, such that any unauthorized use of the emergency alert subsystem is: (i) prevented from occurring, and (ii) readily detected and defeated in case the methods of preventing such surreptitious access are somehow bypassed. Such security methods become even more critical when the EAS client application running on the client device is able to force a re-tuning of the client device to the emergency alert video stream/feed.

Figure 4:
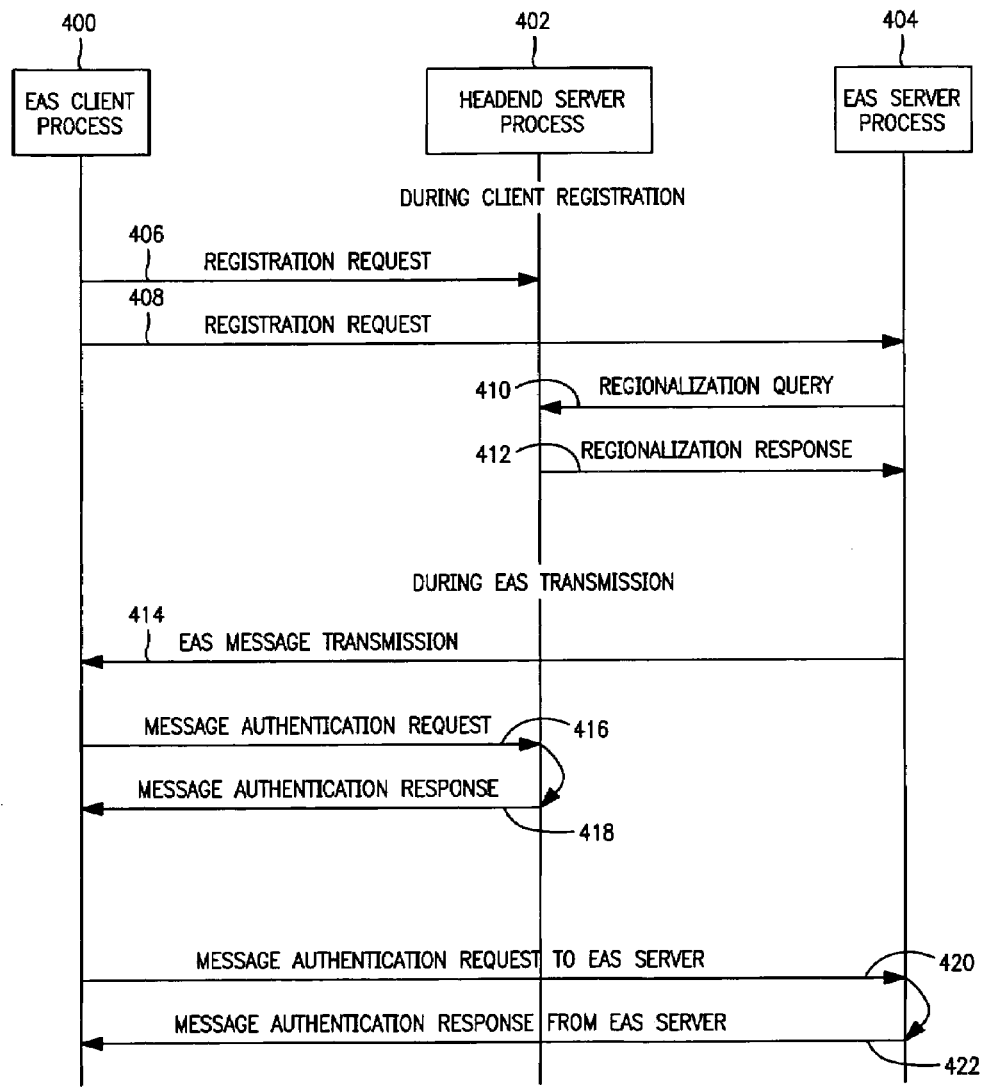
FIG. 4 is graphic representation of an exemplary message exchange protocol showing messages exchanged between various elements of the EAS data processing and delivery system of FIG. 2.

FIG. 4 is a signal exchange diagram highlighting two exemplary embodiments of the present invention wherein the emergency alert messages received by the client devices are explicitly validated by communication between the client device 220 (as represented by the EAS process 400) and a head-end server process 402 (or alternatively the EAS server process 404).

FIG. 4 shows an emergency alert message transmission 414 by the EAS server process 404 to the client device 220 (and its EAS process 400). A request/response pair of messages 416, 418 are also shown, wherein upon reception of the EA message 414, the EAS client 400 requests its authentication from a head-end server process 402. In various embodiments of the invention, the head-end server may comprise for example a digital certificate authority (CA) server, a network management server associated with a cable modem network, or yet another type of server entity adapted for authentication and/or identification functions.

In an alternate embodiment of the request/response authentication process, message exchanges 420, 422 can be used as shown in FIG. 4. In this exchange, the EAS client 400 sends a confirmation request back to the EAS server process 404 at the IP address known to the client to verify that the EAS message was indeed sent by the EAS server process.

Various other embodiments of the message exchange/authentication process are possible according to the invention. These include, but not limited to, use of an encrypted data transmission (e.g., using secure HTTP transmission), and data hashing techniques based on keys. Some data networks may also include a "firewall" or other comparable software mechanism that filters messages arriving from outside the network on TCP or UDP ports specifically assigned to EAS messages. Myriad other approaches and combinations will be recognized by those of ordinary skill when provided the present disclosure.

Instant Messaging Variants—

Figure 5:
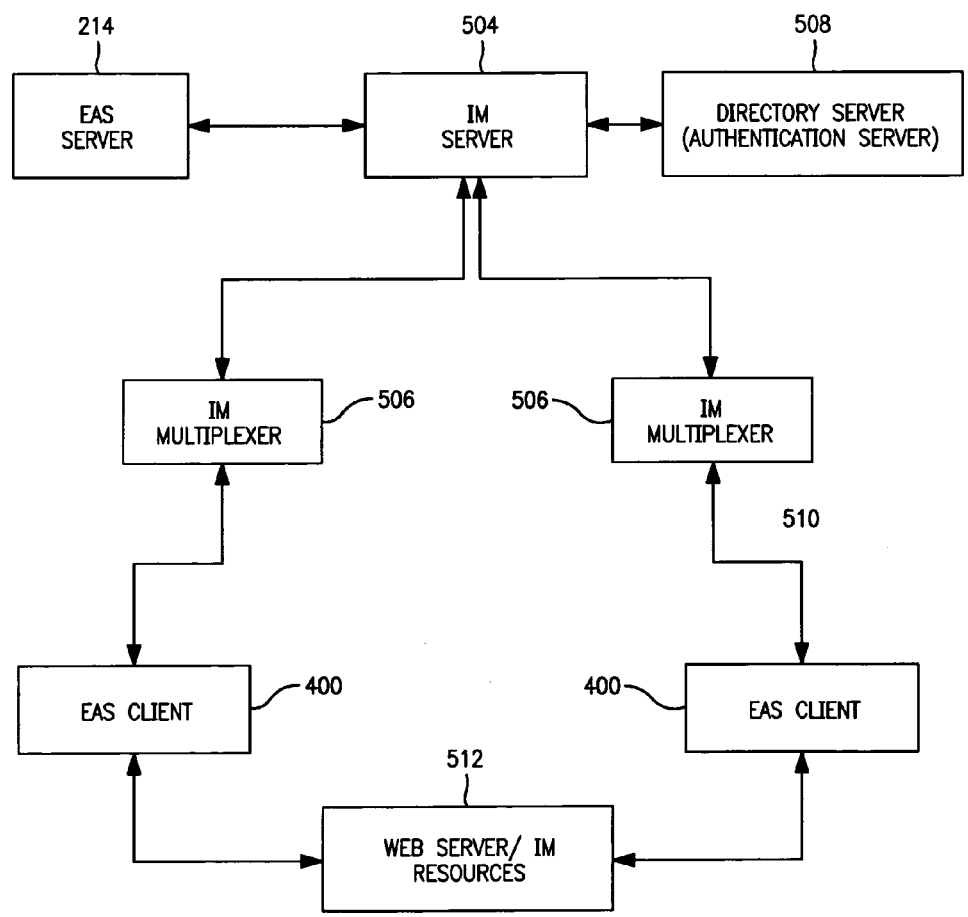
FIG. 5 is a functional block representation of an exemplary IPTV network wherein EAS data distribution utilizes an instant messaging infrastructure.

In one exemplary embodiment of the invention, alert data is provided to the client devices 220 (and the EAS client process 440) by using instant messaging (IM) technology and using IM servers available in the IP network to provide messaging connectivity and transport. An exemplary configuration is shown in FIG. 5. Referring to FIG. 5, the EAS clients 400 (e.g., applications running on the IPTV-enabled PCs) are logically connected via an IP connection to the EAS server process 404. Specifically, a connection is provided between the EAS server 214 and an IM server 504. In turn, the IM server 504 is connected to a Directory Server 508, that also optionally functions as an authentication/identification server. The directory server is used to, inter alia, authenticate IM clients and provide access thereto to EAS data. An IP connection is established between the IM server 504 and the IM (EAS) client application running on the client devices 220 via the IM multiplexers 506 that multiplex/demultiplex EAS data to/from multiple IM clients and the IM server. The client devices 220 are also optionally connected to a web server 512 that makes IM resources available to the IM software running on the client devices.

Figure 5A:
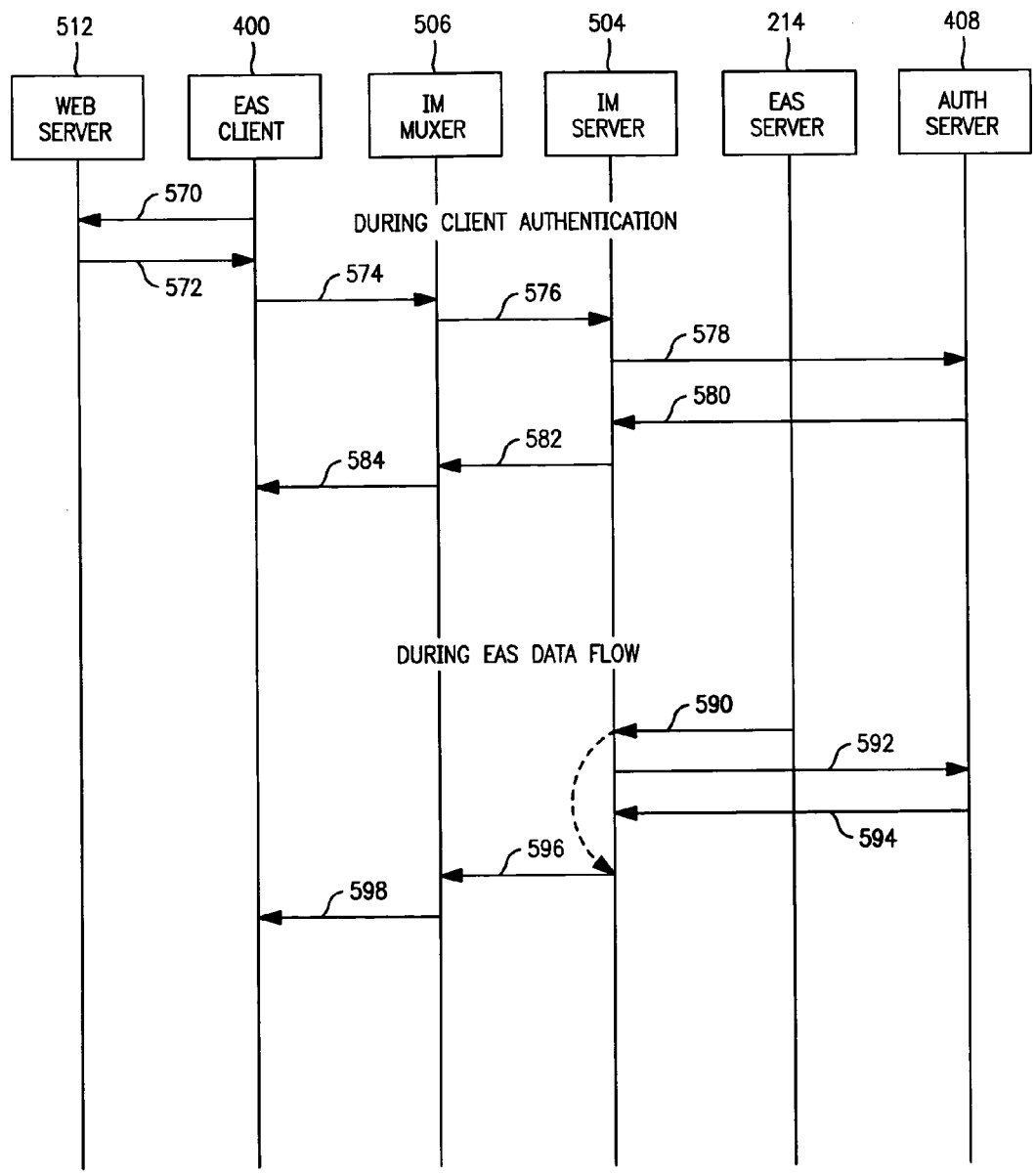
FIG. 5a is graphic representation of an exemplary authentication/identification message exchange protocol showing messages exchanged between various elements of the IM infrastructure of FIG. 5.

Referring to the signal exchange diagram of FIG. 5a, key functional elements of the exemplary system utilizing IM infrastructure for delivery of EAS data include: an EAS client 400, a web server 512, an IM Multiplexer 506, an IM server 504, an EAS server 214, and an authentication/identification server 508. It will be recognized that while illustrated as separate entities for clarity, more than one of the foregoing functions may be implemented on the same hardware platform in certain embodiments of the invention.

FIG. 5a illustrates two sets of signal exchanges that occur during the operation of the exemplary system. During client authentication/identification, the EAS client 400 locates the web server 512 from information available to it (e.g., using electronic program guide information), and sends an EAS data viewing request 570. The issuance of this request by the client process 400 can be structured so that the goal of timely and unimpeded delivery and display of EAS data to valid users is in no way frustrated; e.g., by (i) causing the EAS request 570 to be issued in response to a downstream broadcast "trigger" message issued by the EAS server 214 or other upstream entity (indicating that "flash" EAS traffic is pending delivery), (ii) causing valid EAS clients 400 to periodically issue such requests 570 (somewhat akin to a client device "heartbeat") during operation irrespective of any downstream traffic, and so forth. The web server returns the address of a IM multiplexer (muxer) 506 in a message 572. The client then proceeds to contact the IM muxer 506 using a message 574 presenting its credentials. The IM muxer forwards this request to the appropriate IM server 504 in another message 576. In one embodiment, the client device 220 (and EAS process 400) may be directly provided the resource locator (URL) of the IM muxer 506 or of the IM server 504, thereby making the aforementioned intermediate steps and messaging unnecessary.

The IM server 504 next performs a message exchange with the authentication server 508. In this message exchange, the IM server presents the authentication server 508 with credentials of the EAS client 400 that has requested to receive EAS data per step 578, and in return the authentication server provides the IM server 504 information about the service(s) the EAS client is authorized to receive (step 580). Once the client device is authenticated (or not authenticated), an appropriate success or reject message is sent by the IM server (step 582) via the IM muxer or another channel to the EAS client 400 (step 584).

When the EAS client determines that it must receive EAS data, the client device 220 contacts the EAS server 214. If the device 220 is not previously known or served, the EAS server may want to check its credentials and service level by sending a query to the IM server 404 (step 590), which in turn communicates with the authentication server 508 via query (step 592) and response (step 594) mechanisms. Once the device 220 is authenticated, EAS data begins to flow from the EAS server (step 594) to the IM muxer (step 596) and ultimately to the EAS-capable client device (step 598).

It will be appreciated that many of the steps illustrated within the exemplary protocol of FIG. 5a can be obviated in favor of reduced client device/process authentication if desired. For example, in order to avoid situations where a client process can't authenticate, thereby preventing their receipt of the EAS data, the authentication can be waived or eliminated. However, the presence of client process authentication helps eliminate the ability of surreptitious attempts to "engage" the EAS server 214 or other entities within the system architecture in order to effectuate a denial-of-service or similar type of attack that could affect other IM EAS users.

Additionally, since the EAS "trigger" message may go out to many clients 400 at effectively the same time (thereby triggering a surge in upstream requests for client process authentication), the trigger messages (and/or the EAS data requests from the clients can be staggered, buffered, or otherwise diffused in time or location to reduce the burden on the IM/authentication server(s).

Re-use of existing Instant Messenger (IM) service infrastructure for EAS message transmission provides a convenient way to deploy EAS in an IPTV network by reusing many software components typically available on many IPTV platforms. However, it may not be adequate to meet some government EAS requirements where non-EAS adapted IM client applications (i.e., "off-the-shelf" versions of IM applications such as AOL Instant Messenger or the like) are used. For example, such non-EAS adapted applications may not be able to mute audio played within an IPTV video client unless specifically configured to do so. Similarly, the IM client may not be able to force re-tune a video decoder instantaneously to an EAS channel (if a video feed is available with the emergency alert message) unless specifically configured.

However, the present invention contemplates that these features and functions can be addressed by the network operator/MSO by either (i) providing a "customized" or EAS-adapted IM client with such capabilities, or (ii) coordinating with the IM client developers to include these features as part of an upgrade package to the software, both of which can be readily downloaded to the client device via the IP or other network. For example, such EAS-adapted IM client could be configured to generate and transmit a "retune" message to IP-enabled video client 400 running on the client device 220 to effectuate a retune event. Alternatively, the IM client application can be integrated within the EAS client process 400, so that IM capability is integral to the EAS client upon installation. Myriad other approaches may be used as well.

Client Protocol Stack and Emergency Video Feed Considerations—

Various aspects of the client device operation and protocol stack must be considered in the context of EAS data/video delivery.

In the case of a forced tune to an emergency alert video feed, several functional elements of the end-to-end EAS subsystem must work in coordination with each other. Specifically, the emergency alert video servers 214 must have sufficient availability and capability such that video in multiple formats (Quicktime, Windows Media, H.264, etc.) can be streamed appropriately to client devices.

Figure 6:
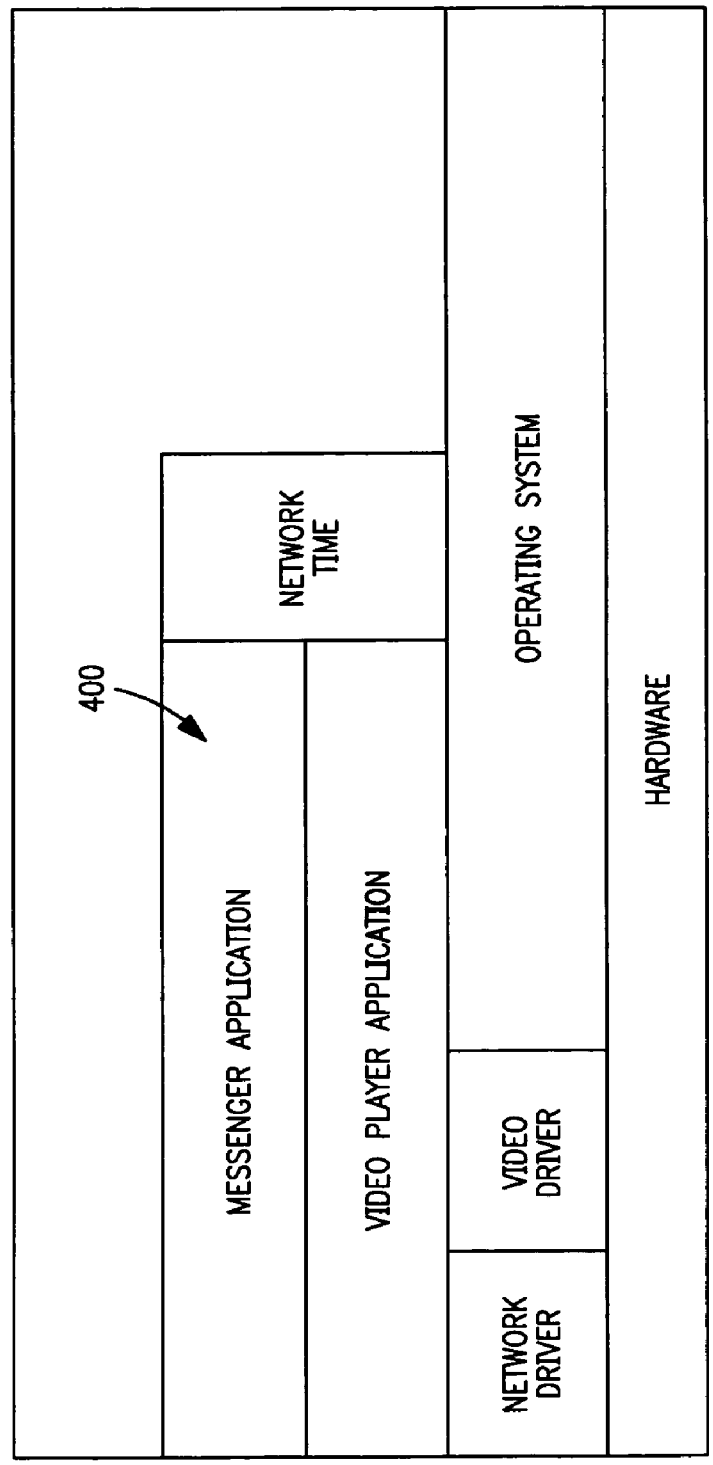
FIG. 6 illustrates one exemplary embodiment of a client device (e.g., PC) protocol stack illustrating the placement of the EAS client (e.g., messenger application) of the present invention therein.

Additionally, the client device 220 application software stack must be arranged such that the EAS client application is able to force tuning of the video decoder application, as well as muting the ongoing audio portion of the pre-existing content-based program, and output EAS audio in its place. In this sense, the EAS client acts somewhat like an OCAP "monitor" application for a DSTB; the EAS client must have significant control over the necessary hardware/firmware/software processes in order to effectuate these functions, such as being able to immediately terminate audio decoding (or at least the feed of decoded audio data to the audio delivery hardware) in favor of the EAS audio data. FIG. 6 illustrates one exemplary client device (e.g., PC) protocol stack illustrating the placement of the EAS client 400 (here, embodied to include a messenger application) of the present invention therein.

The EAS re-tuning message(s) must also be authenticated so that "spoof" EAS re-tuning attempts are avoided or eliminated. For example, this can be accomplished by authenticating the message itself (hashing, digital certificates), authenticating the source of the message (e.g., DomainKeys by Yahoo or by explicit request/response signal exchange as described above), and/or by authenticating the IP address/port ID to which the EAS message is requesting a re-tuning (for example, forced re-tuning can only occur when the target comprises a fixed or predetermined IP/port combination as pre-programmed in the EAS client).

Additionally, EAS messages are typically meant to be relevant only at the time at which they are transmitted. It is therefore sometimes advantageous to filter these messages out from personal video recording (PVR) or similar functions where latency (or geographic "shifting") is introduced. If a media program is being actively viewed and recorded simultaneously, the EAS client 400 should be designed to preserve all of the desired EAS effects (i.e., audio substitution, graphical display of text, video forced tuning) to the end user display device/process, without providing such effects for the recording device/process. Hence, in one embodiment, the recording process precedes the overlay or display of the EAS information, thereby preventing the EAS information from being recorded. This functionality is typical in many existing devices, and hence does not require significant adaptation in order to implement the present invention. In an alternate embodiment, the EAS client 400 is configured to identify media program streams which are being recorded (such as to a hard drive resident or in data communication with the client device 220), and allow them to continue recording unchanged, while the viewed stream is altered as previously described. Hence, the EAS client is given the ability to differentiate between various hardware devices and associated processes on the client device (e.g., recording and display), and treat them in an agnostic fashion.

Personal Video Encoder (PVE) Variants—

In another embodiment of the invention, a personal video encoder (PVE) or comparable device is used as the basis for the client device 220. For example, the "Slingbox" device manufactured by Sling Media of San Mateo, Calif. is one such exemplary device which is capable of enabling a user to watch TV programming from various locations via an Internet-connected PC or similar device. The device is generally connected between the subscriber's cable/satellite video drop and DSTB, and has a TV tuner inside. The user tunes to a given channel, and the device encodes the video streamed over the cable/satellite in Windows Media or similar format. The encoded content is streamed to a client application on a Windows XP-based or similar PC via an IP network such as the Internet, and hence the user can view the data locally (i.e., at the same premises) or remotely so long as they have access to the IP distribution network. Such devices, however, do not have the ability to receive, render and deliver the EAS data to the appropriate user application, or to invoke tuning to an EAS-supplied video stream. Such devices are also not able to substitute EAS audio data for the audio portion of a currently streaming video program. Hence, the present invention advantageously extends the capability of such PVE devices by providing the capability to receive the CC data and deliver it (e.g., in an OOB-fashion) to the Windows-based or other client application for display and rendering, as well as control functions (e.g., how large the text is when displayed, where it is displayed, language, etc.).

In one embodiment, the PVE merely acts as pass-through or router entity, with the EAS data receipt, decoding and player functions being disposed entirely on the PC or laptop computer used as the subscriber's "viewing" device at their actual location.

The EAS-enabled client on the user's PC or similar device provides the aforementioned "forced tune" functionality as well as audio portion substitution within the "remote" client device. In another embodiment, the PVE is outfitted with the necessary EAS data receiving and decoding software, which receives the EAS data and then acts as a full-function proxy for the remote client device (akin to the prior art "analog" approach previously described herein, except in the context of a digital PVE environment).

Business Methods—

In another aspect of the invention, methods of doing business associated with the EAS data delivery capability previously disclosed herein are now described in detail.

In one variant, these methods effectively bundle or link one or more features not critical to (but ideally useful or desirable with) the EAS data delivery in order to provide subscribers enhanced functionality and "user experience." While the provision of basic EAS data (e.g., audio, text, and/or video) to subscribers is essentially mandated by federal regulation, ancillary services or capabilities are not, and subscribers may find these ancillary services and capabilities useful. These ancillary services or features can comprise a basis for a multi-tiered or "premium" subscriber class business model, be given as an incentive feature for a subscription, or otherwise.

One exemplary ancillary service that can be bundled with the EAS data delivery comprises the ability to "pass through" EAS data or communications to remote entities in data communication with the base (e.g., IP) distribution network. For example, the aforementioned PVE device (e.g., Slingbox or similar) can be distributed under lease (or for free) to subscribers as part of the model. The PVE device allows the subscriber to access network programming via their mobile device (e.g., laptop) from a remote location. It would be highly desirable for many users, especially those who travel frequently, to have assurance of receiving EAS information via their mobile or remote devices, since such EAS communications will likely be of some import regarding that subscriber's home, business, family, etc. For example, a subscriber may wish to know that their residence is subject to a hurricane or tornado warning so that they can take pre-emptive action or monitor the situation more closely. This also would relieve them of the requirement of monitoring conventional information channels such as TV news or radio in their current (remote) area in order to glean information regarding the location of their residence, etc. Hence, the system could become a "remote first warning" mechanism for the subscriber, irrespective of their location. Only connectivity to the bearer (e.g., IP) network would be required in order to utilize this feature.

Another such ancillary service could comprise providing topically related or coupled information sources, such as e.g., direct or real-time Doppler radar feeds from NWS or similar entities in the local region in the case of an EAS tornado alert message, or NWS satellite or radar imaging for an impending hurricane. These ancillary sources could directly coupled to the EAS data delivery, such as where the video stream/feed to which the EAS client 400 tunes includes this information along with or in place of the less-descriptive federally mandated information. For example, in one variant, a multi-pane display comprising, e.g., (i) the federally mandated alert message or data, (ii) local evacuation route/traffic information, (iii) Doppler/satellite imaging, and (iv) real-time "incident" reporting (somewhat akin to real-time traffic incident reporting "blogs" currently maintained by California DOT/Highway Patrol) could be provided to subscribers in order to provide them multi-source data fusion when it is most needed (i.e., at the time of report). This also obviates the subscriber having to hunt for this information, such as by channel hopping, thereby wasting potentially precious time. This can also be coupled to the aforementioned PVE capability if desired, thereby providing the user with a mobile source of fused data (e.g., via a WiFi or WiMax node, cellular interface, satellite link, or other mobile communications link).

The methods and apparatus of co-pending and co-owned U.S. patent application Ser. No. 11/198,620 filed Aug. 4, 2005 and entitled "METHOD AND APPARATUS FOR CONTEXT-SPECIFIC CONTENT DELIVERY", which is incorporated herein by reference in its entirety may also be utilized in conjunction with the present invention. Specifically, the aforementioned application discloses, inter alia, methods and apparatus for utilizing metadata or similar data structures associated with video content as a basis for providing targeted and seamless linking to a secondary content source (e.g., advertising server links) within a video player window displayed on a PC or similar device. Accordingly, the secondary content sources could be constrained in one embodiment to include those of particular relevance to certain emergency situations. For example, in the case of an EAS message or video feed relating to a tornado, the data/feed could be embedded or associated with metadata (e.g., XML formatted "tornado") that could be used as the basis of accessing content sources (web sites, local files, third party servers, etc.) that are particularly relevant to and/or useful for tornados, such as the NWS tornado watch site, the local traffic report website, etc. Hence, the user views the relevant EAS content and then is immediately presented with a group of relevant links for further information.

It will also be recognized that due to substantial similarities, the methods and apparatus for caption data (closed captioning) delivery described in co-owned and co-pending U.S. patent application Ser. No. 11/298,247 filed contemporaneously herewith and entitled "CAPTION DATA DELIVERY APPARATUS AND METHODS", previously incorporated herein, can be readily used in conjunction with the EAS data delivery apparatus and methods described herein. For example, a common EAS and CC server entity can be specified at the head-end 150 or another node to permit the EAS and CC functions to be integrated. Furthermore, the EAS client application can include CC functionality (or vice versa), which may also include the ability to support one or more commercial video decoders (such as Real, H.264, WMP, etc.) as well as IM capability.

It will also be recognized that one or more existing software applications can be used with the present invention to provide the primary functionality of that application in an "EAS-enabled" fashion. For example, in one exemplary embodiment, the Yahoo! Messenger application is used to provide streaming IP media delivery (e.g., chat, audio, video, etc.) that is also enabled for EAS delivery. Myriad other variants of this basic idea will also be recognized by those of ordinary skill provided the present disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. In a content-based network having a server and a client device in data communication therewith, a method of providing primary content, emergency-related secondary content, and contextually-related tertiary content to users of said network, said method comprising:

delivering said primary content to said client device;
    delivering said secondary content to said client device;
    accessing a descriptive data file associated with said secondary content in order to obtain descriptive data therefrom, said descriptive data relating to at least one aspect of said emergency-related content;
    providing said descriptive data to a processing entity to identify contextually related tertiary content;
    transmitting said secondary and tertiary content to said client device over said network; and
    selectively displaying said primary content and at least one of said secondary and tertiary content on a display device associated with said client device.

2. The method of claim 1, wherein said act of displaying comprises displaying said secondary and tertiary content in a common display window generated by a software application adapted for playing audiovisual content.

3. The method of claim 2, wherein:

said act of displaying further comprises displaying said tertiary content immediately following the completion of the display of said secondary content; and
    said tertiary content comprises substantially textual links to other information.

4. The method of claim 1, wherein said contextually-related tertiary content comprises additional information generated from sources other than a source of said emergency-related secondary content.

5. In a content-based network having a server and a client device in data communication therewith, a method of providing primary content, emergency-related secondary content, and contextually-related tertiary content to users of said network, said method comprising:

delivering said primary content to said client device;
    delivering said secondary content to said client device;
    accessing a descriptive data file associated with said secondary content in order to obtain descriptive data therefrom, said descriptive data relating to at least one aspect of said emergency-related content;
    providing said descriptive data to a processing entity to identify contextually related tertiary content comprising substantially textual links to other information;
    transmitting said secondary and tertiary content to said client device over said network; and
    selectively displaying said primary content and said secondary and tertiary content on a display device associated with said client device, said displaying comprising:
        displaying said secondary and tertiary content in a common display window generated by a software application adapted for playing audiovisual content; and
        displaying said tertiary content immediately following the completion of the display of said secondary content.

6. The method of claim 5, wherein said content-based network comprises an Internet Protocol Television (IPTV) network.

7. The method of claim 5, wherein said content-based network comprises at least portions of an HFC cable network including at least one cable modem interposed between said server and said client device.

8. The method of claim 5, wherein said emergency-related secondary content comprises video, text, and audio content, and said method further comprises selectively transmitting video content via a packet stream different than a packet stream carrying said audio and/or text content.

9. The method of claim 5, further comprising generating a message causing said client device to forcibly tune to a designated program stream to receive at least a portion of said emergency-related secondary content.

10. The method of claim 5, further comprising authenticating said client device prior to said delivering of said primary, secondary or tertiary content thereto.

11. The method of claim 5, wherein said textual links to other information comprise textual links to at least one of: traffic information; reporting information; and imaging information.

12. In a content-based network having a server and a client device in data communication therewith, a method of content to users of said network, said method comprising:

accessing a data file comprising at least one aspect of emergency-related content;
    identifying, based at least in part on said at least one aspect, second content related to the context of said emergency-related content, said second content comprising substantially textual links to other information;
    transmitting said emergency-related content and said second content to said client device over said network; and
    selectively displaying said emergency-related and said second content on a display device associated with said client device, said act of displaying comprising displaying said emergency-related and said second content in a common display window generated by a software application adapted for playing audiovisual content, said display of said second content immediately following the completion of said display of said emergency-related content.

13. The method of claim 12, wherein said server is adapted to deliver said emergency-related content, and comprises at least one of:

a video streaming server; and
    an emergency alert server.

14. The method of claim 12, wherein said act of transmitting said emergency-related content further comprises formatting one or more emergency alerts into said emergency-related content having a format suitable for transport over said network.

15. The method of claim 14, wherein said formatting comprises creating multiple packet formats for the same data, said packet formats being selected to meet one or more requirements associated with a plurality of client devices.

16. The method of claim 12, wherein:

said server comprises a multimedia server configured to send multimedia programs; and
    said act of transmitting further comprises presenting an audio portion of said emergency-related content in place of the audio of at least one of said multimedia programs.

17. The method of claim 12, wherein said server comprises a multimedia server configured to send multimedia programs, and wherein said method further comprises:

delivering said one or more multimedia programs to said client device over a first transport stream associated with a first process running on said client device; and delivering said emergency-related content to said client device over a second transport stream different from said first transport stream and associated with a second process running on said client device.

18. A client device of a content-based network in communication with at least one server, said client device comprising:

a receiver adapted to receive primary content, emergency-related secondary content, and tertiary content, said tertiary content comprising substantially textual links to other information, said other information being related to at least one aspect of said emergency-related secondary content; and at least one display device adapted to display said primary content, said secondary content and said tertiary content, said display of said secondary and tertiary content occurring in a common display window generated by a software application adapted for playing audiovisual content and said display of said tertiary content immediately following completion of said display of said secondary content.

19. The client device of claim 18, wherein said at least one display device is associated with a video player application configured to display at least a portion of said primary content, and a messaging client application configured to display at least a portion of said emergency-related secondary content.

20. The client device of claim 18, wherein said at least one display device is associated with at least one computer program configured to receive said emergency-related secondary content, said computer program comprising an instant messaging program.

21. An apparatus capable of selectively providing primary content, emergency-related secondary content, and contextually-related tertiary content to a plurality of client devices receiving content transmitted over a packet-switched network, the apparatus comprising:

a transmitter adapted to deliver said primary content and said emergency-related secondary content to individual ones of said plurality of client devices; and a processor adapted to run at least one computer program thereon, said computer program configured to:

access a descriptive data file associated with said emergency-related secondary content in order to obtain descriptive data therefrom, said descriptive data relating to at least one aspect of said emergency-related secondary content;

identify said contextually-related tertiary content; and cause said transmitter to transmit said contextually-related tertiary content to said individual ones of said plurality of client devices for display thereon.

22. The apparatus of claim 21, wherein said transmission of said primary content, said emergency-related secondary content, and said contextually-related tertiary content is based at least in part on information identifying the location of cable modem units associated with respective ones of said plurality of client devices.

23. The apparatus of claim 21, wherein said apparatus is configured to generate a message to one or more of said plurality of client devices causing said one or more client devices to forcibly tune to a designated program stream to receive at least a portion of said emergency-related secondary content.

24. The apparatus of claim 21, wherein said computer program is further configured to selectively provide services to respective ones of said plurality of client devices, said services comprising services which are related to the context of said emergency-related secondary content.

25. The apparatus of claim 21, wherein said contextually-related tertiary content comprises at least one of:

evacuation route or traffic information;

Doppler or satellite imaging; and real-time reporting information.

26. In a content-based network having a server and a client device in data communication therewith, a method of providing primary content, emergency-related secondary content, and contextually-related tertiary content to users of said network, said method comprising:

delivering said primary content to said client device;

delivering said secondary content to said client device;

accessing a descriptive data file associated with said secondary content in order to obtain descriptive data therefrom, said descriptive data relating to at least one aspect of said emergency-related content;

providing said descriptive data to a processing entity to identify contextually related tertiary content;

transmitting said secondary and tertiary content to said client device over said network;

selectively displaying said primary content, secondary content, and tertiary content on a display device associated with said client device.

* * * * *

UNITED STATES PATENT AND TRADEMARK OFFICE
CERTIFICATE OF CORRECTION

PATENT NO. : 7,592,912 B2
APPLICATION NO. : 11/299169
DATED : September 22, 2009
INVENTOR(S) : Charles Hasek et al.

It is certified that error appears in the above-identified patent and that said Letters Patent is hereby corrected as shown below:

Column 26, lines 24 through 44 (Claim 12):

"12. In a content-based network having a server and a client device in data communication therewith, a method of content to users of said network, said method comprising:
accessing a data file comprising at least one aspect of emergency-related content;
identifying, based at least in part on said at least one aspect, second content related to the context of said emergency-related content, said second content comprising substantially textual links to other information; transmitting said emergency-related content and said second content to said client device over said network;
and
selectively displaying said emergency-related and said second content on a display device associated with said client device, said act of displaying comprising displaying said emergency-related and said second content in a common display window generated by a software application adapted for playing audiovisual content, said display of said second content immediately following the completion of said display of said emergency-related content."

Should Read:
--12. In a content-based network having a server and a client device in data communication therewith, a method of <u>delivering</u> content to users of said network, said method comprising:
accessing a data file comprising at least one aspect of emergency-related content;
identifying, based at least in part on said at least one aspect, second content related to the context of said emergency-related content, said second content comprising substantially textual links to other information; transmitting said emergency-related content and said second content to said client device over said network;
and
selectively displaying said emergency-related and said second content on a display device associated with said client device, said act of displaying comprising displaying said emergency-related and said second content in a common display window generated by a software application adapted for playing audiovisual content, said display of said second content immediately following the completion of said display of said emergency-related content.--

Signed and Sealed this

Tenth Day of August, 2010

David J. Kappos
*Director of the United States Patent and Trademark Office*